(12) United States Patent
Leung

(10) Patent No.: US 9,143,457 B2
(45) Date of Patent: Sep. 22, 2015

(54) METHODS AND APPARATUS FOR ECN RECEIVER DRIVEN CONGESTION CONTROL

(75) Inventor: Nikolai Konrad Leung, Tacoma Park, MD (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 13/252,996

(22) Filed: Oct. 4, 2011

(65) Prior Publication Data

US 2012/0087244 A1    Apr. 12, 2012

Related U.S. Application Data

(60) Provisional application No. 61/390,584, filed on Oct. 6, 2010.

(51) Int. Cl.
*H04L 1/00*   (2006.01)
*H04L 12/825*   (2013.01)
*H04L 12/801*   (2013.01)
*H04L 12/833*   (2013.01)

(52) U.S. Cl.
CPC .............. *H04L 47/263* (2013.01); *H04L 47/12* (2013.01); *H04L 47/14* (2013.01); *H04L 47/17* (2013.01); *H04L 47/31* (2013.01)

(58) Field of Classification Search
USPC .......................................... 370/230, 236, 237
See application file for complete search history.

(56) References Cited

U.S. PATENT DOCUMENTS

| | | | |
|---|---|---|---|
| 5,633,859 A | 5/1997 | Jain et al. | |
| 6,535,482 B1 | 3/2003 | Hadi Salim et al. | |
| 6,741,555 B1 | 5/2004 | Li et al. | |
| 6,839,321 B1 | 1/2005 | Chiruvolu | |
| 6,876,639 B1 | 4/2005 | Cao | |
| 8,081,566 B1 * | 12/2011 | Ashwood-Smith et al. | .. 370/230 |

(Continued)

FOREIGN PATENT DOCUMENTS

| | | |
|---|---|---|
| EP | 1217804 A2 | 6/2002 |
| JP | H09247174 A | 9/1997 |

(Continued)

OTHER PUBLICATIONS

"3rd Generation Partnership Project; Technical Specification Group Services and System Aspects; Enabling Coder Selection and Rate Adaptation for UTRAN and E-UTRAN for Load Adaptive Applications; Stage 2 (Release 10)".3GPP Standard; 3GPP TR 23.860, 3rd Generation Partnership Project (3GPP),Mobile Competence Centre; 650, Route Des Lucioles; F-06921 Sophia-Antipolis CEDEX France No. V2.0.0, Jun. 14, 2010,pp. 1-14, XP050441624, [retrieved on Jun. 14, 2010] p. 7-p. 8 p. 10-p. 11.

(Continued)

*Primary Examiner* — Michael Thier
*Assistant Examiner* — Brian Cox
(74) *Attorney, Agent, or Firm* — Knobbe Martens Olson & Bear, LLP

(57) ABSTRACT

Certain embodiments relate to systems and methods for managing congestion notification and control across a network. In certain aspects, a protocol for managing sender and receiver-based congestion control is provided using a format for streaming parameters, such as the Session Description Protocol format. In certain aspects, a system and method for operating an interworking gateway between different user devices is provided.

44 Claims, 20 Drawing Sheets

(56) References Cited

U.S. PATENT DOCUMENTS

| | | |
|---|---|---|
| 2002/0150060 A1 | 10/2002 | Montpetit |
| 2002/0194361 A1 | 12/2002 | Itoh et al. |
| 2003/0018794 A1 | 1/2003 | Zhang et al. |
| 2003/0123455 A1 | 7/2003 | Zhao et al. |
| 2003/0139145 A1 | 7/2003 | Lee et al. |
| 2004/0052212 A1 | 3/2004 | Baillargeon |
| 2004/0081092 A1 | 4/2004 | Rhee et al. |
| 2004/0148423 A1 | 7/2004 | Key et al. |
| 2004/0196785 A1 | 10/2004 | Janakiraman et al. |
| 2006/0092836 A1 | 5/2006 | Kwan et al. |
| 2006/0193261 A1 | 8/2006 | Sethi |
| 2006/0250953 A1 | 11/2006 | Mooney et al. |
| 2006/0251050 A1 | 11/2006 | Karlsson |
| 2007/0028003 A1 | 2/2007 | Rudkin |
| 2008/0198746 A1 | 8/2008 | Kwan et al. |
| 2008/0267070 A1 | 10/2008 | Mannal et al. |
| 2009/0054102 A1 | 2/2009 | Jung |
| 2009/0285099 A1 | 11/2009 | Kahn et al. |
| 2010/0027547 A1 | 2/2010 | Shinozaki |
| 2010/0195521 A1 | 8/2010 | Wanstedt et al. |
| 2010/0246400 A1 | 9/2010 | Onishi et al. |
| 2010/0254262 A1 | 10/2010 | Kantawala et al. |
| 2010/0274871 A1 | 10/2010 | Harrang et al. |
| 2010/0309788 A1 | 12/2010 | Ho et al. |
| 2011/0002224 A1 | 1/2011 | Tamura |
| 2011/0016209 A1 | 1/2011 | Moncaster et al. |
| 2011/0032935 A1* | 2/2011 | Yang .......................... 370/389 |
| 2011/0075563 A1 | 3/2011 | Leung et al. |
| 2011/0128967 A1 | 6/2011 | Belling |
| 2011/0170410 A1 | 7/2011 | Zhao et al. |
| 2011/0202622 A1 | 8/2011 | Cadiou et al. |
| 2012/0051216 A1 | 3/2012 | Zhang et al. |
| 2012/0087245 A1 | 4/2012 | Leung |

FOREIGN PATENT DOCUMENTS

| | | |
|---|---|---|
| JP | H11150534 A | 6/1999 |
| JP | 2004015761 A | 1/2004 |
| JP | 2011503994 A | 1/2011 |
| WO | WO2006085184 A1 | 8/2006 |
| WO | WO-2008149434 A1 | 12/2008 |
| WO | WO-2009056968 A2 | 5/2009 |
| WO | WO2009090160 A1 | 7/2009 |
| WO | WO-2011055721 A1 | 5/2011 |

OTHER PUBLICATIONS

"3rd Generation Partnership Project; Technical Specification Group Services and System Aspects; IP Multimedia Subsystem (IMS); Multimedia Telephony; Media handling and interaction (Release 9)", 3GPP Standard; 3GPP TS 26.114, 3rd Generation Partnership Project (3GPP),Mobile Competence Centre ; 650, Route Des Lucioles ; F-06921 Sophia-Antipolis Cedex ; France, No. V9.3.0, Jun. 9, 2010,pp. 1-215, XP050441542, [retrieved on 2010-06-09] section 6.1; p. 21 p. 68.

International Search Report and Written Opinion—PCT/US2011/054961—ISA/EPO—Dec. 2, 2011.

International Search Report and Written Opinion—PCT/US2010/050874—ISA/EPO—Jun. 15, 2011.

Ramakrishnan, K. et al., "The Addition of Explicit Congestion Notification (ECN) to IP", Network Working Group, Standards Track, RFC 3168, pp. 1-63, The Internet Society, Sep. 2001.

European Telecommunications Standards Institute; Universal Mobile Telecommunications System (UMTS): LTE: IP Multimedia Subsystem (IMS): Multimedia Telephony: Media Handling and Interaction 3GPP TS 26.114 version 9.3.0 Release 9 (Jun. 9, 2010) pp. 1-217.

Westerlund et al., "Explicit Congestion Notification (ECN) for RTP over UDP, draft-ietf-avt-ecn-for-rtp-02.txt", Internet Engineering Task Force (IETF), standardworkingdraft, Internet Society (ISOC) 4, Rue Des Falaises CH-1205 Geneva, Switzerland, No. 2, Jul. 10, 2010, pp. 1-47, XP015069884, [retrieved on Jul. 10, 2010].

Qualcomm Europe S.A.R.L: "ECN UE Procedures", 3GPP Draft; Document No. S4-AHM171; 3GPP TSG-SA WG4 MTSI on ECN Adhoc Meeting, Kista, Sweden; Oct. 6, 2009, 5 pages.

\* cited by examiner

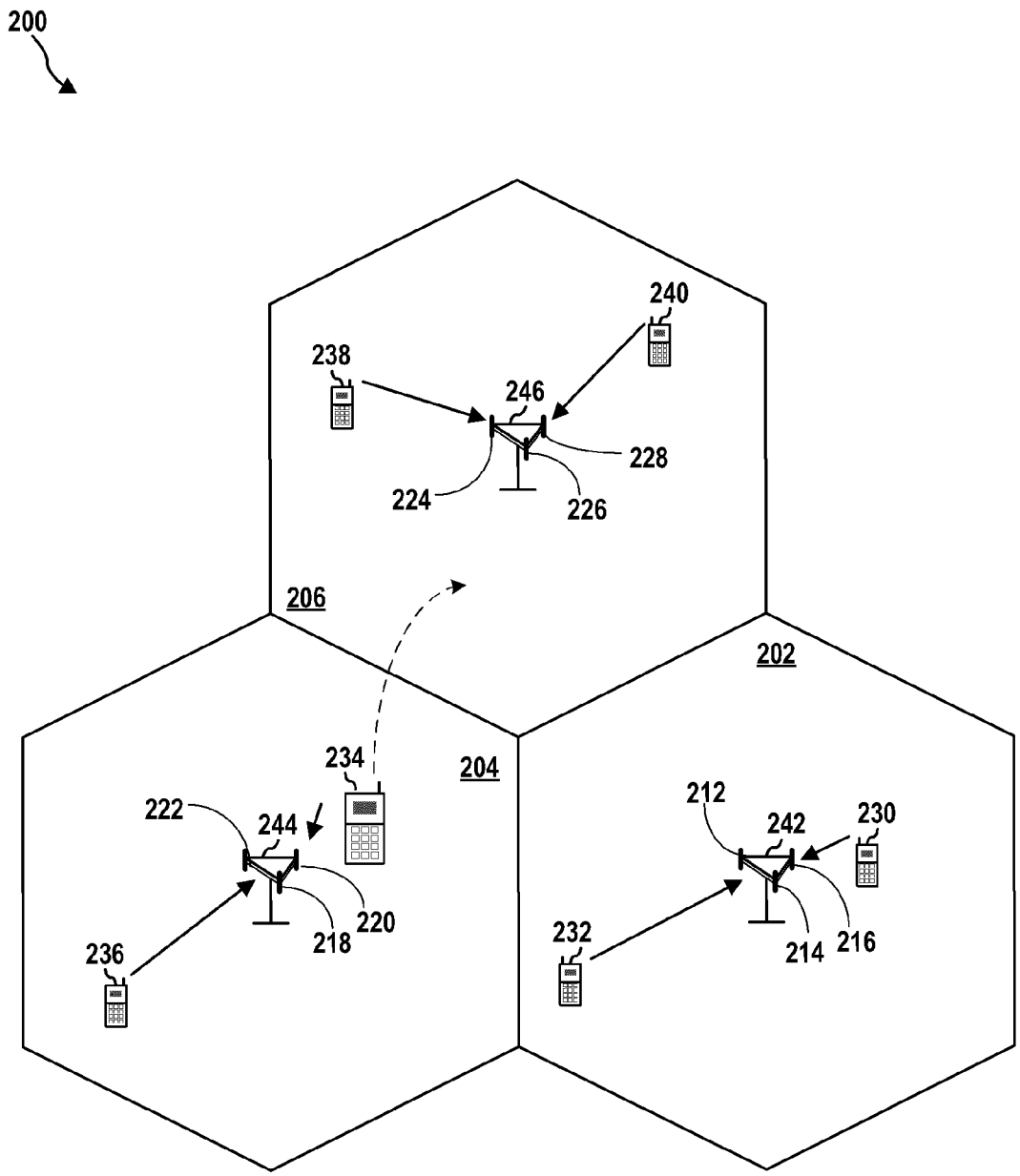
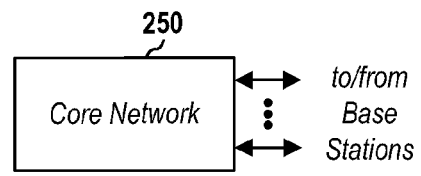
FIG. 2

One Example of Standardized Rate Request

One Example of Standardized Rate Request

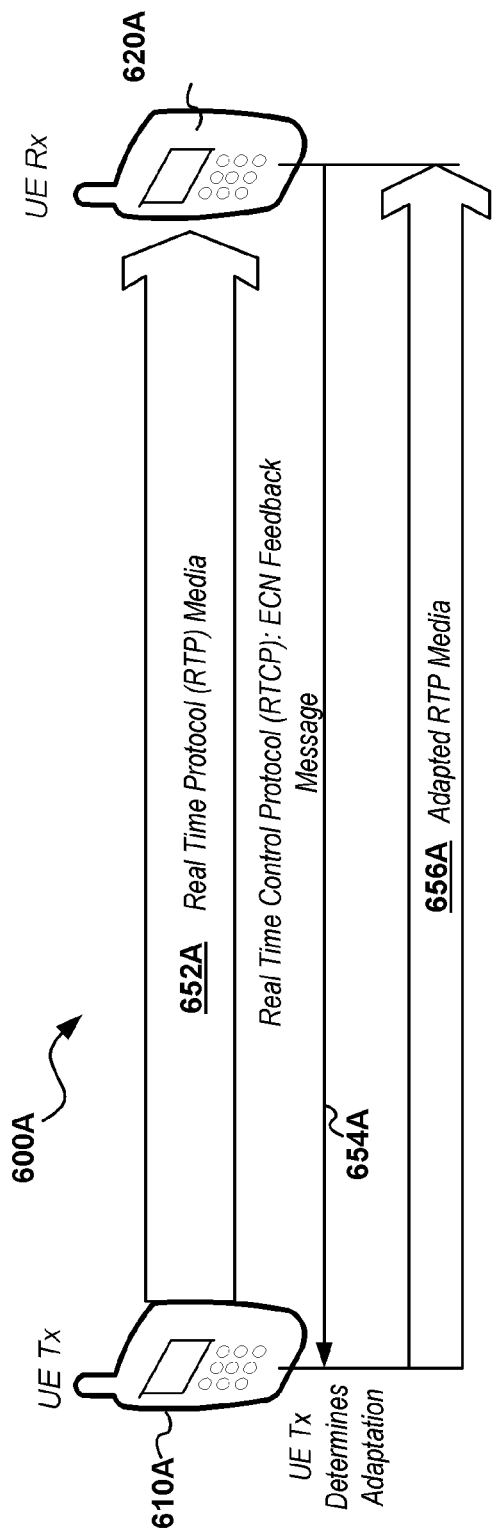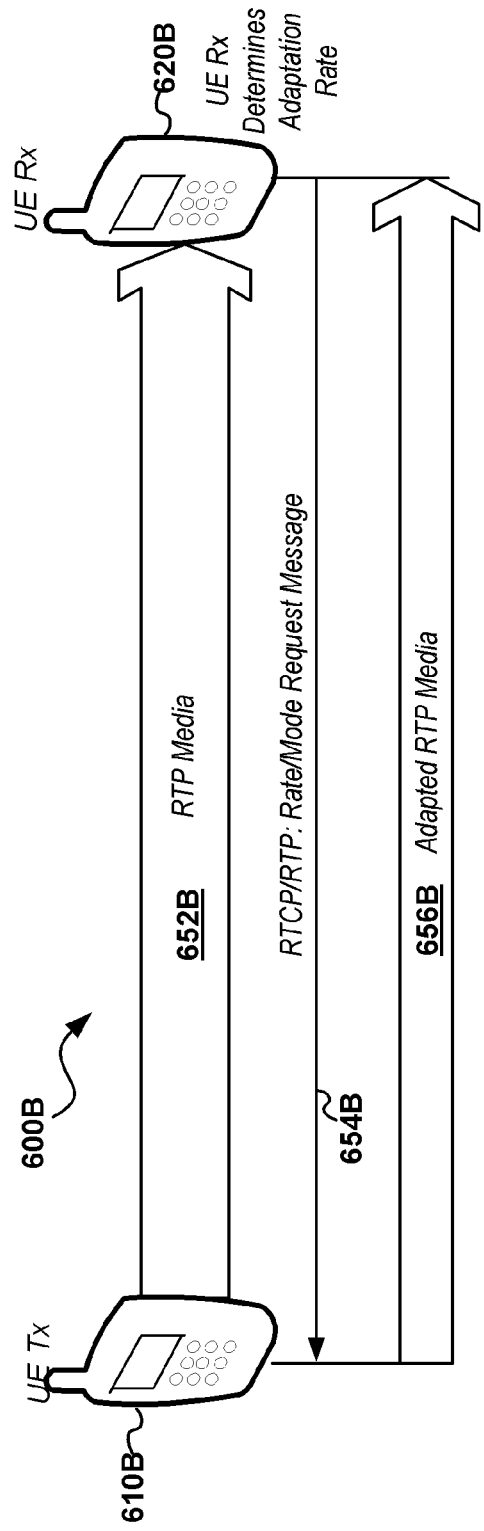
FIG. 9

Example of Congestion Control Per Terminal

Example of Interworking Between Tx and Rx Driven CC

*Example of Interworking Between Tx and Rx Driven CC*

METHODS AND APPARATUS FOR ECN RECEIVER DRIVEN CONGESTION CONTROL

CROSS-REFERENCE TO RELATED APPLICATIONS

This application claims the benefit under 35 U.S.C. Section 119(e) of and commonly-assigned U.S. Provisional Patent Application Ser. No. 61/390,584, filed on Oct. 6, 2010, entitled "METHODS AND APPARATUS FOR ECN RECEIVER DRIVEN CONGESTION CONTROL" which application is incorporated by reference herein in its entirety.

TECHNICAL FIELD

The systems and methods disclosed herein relate generally to data communication systems and particularly to notification regarding congestion in network traffic.

BACKGROUND OF THE INVENTION

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs)). Each terminal communicates with one or more base stations (also know as access points (APs), EnodeBs or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via a single-in-single-out, single-in-multiple out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into NS independent channels, which are also referred to as spatial channels. Generally, each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Base station nodes, sometimes referred to as eNBs, have different capabilities for deployment in a network. This includes transmission power classes, access restriction, and so forth. In one aspect, heterogeneous network characteristics create wireless coverage dead spots (e.g., Donut coverage hole). This may cause severe inter-cell interference requiring undesirable user equipment cell association. In general, heterogeneous network characteristics require deep penetration of physical channels which may cause unwanted interference between nodes and equipment on the respective network.

Explicit Congestion Notification (ECN) is an extension to the Internet Protocol (IP) and to the Transmission Control Protocol (TCP) and is defined in RFC 3168 (2001). ECN allows end-to-end notification of network congestion dropping packets, and is an optional feature that is only used when both endpoints support it and are willing to use it. ECN is only effective when supported by the underlying network. Traditionally, TCP/IP networks signal congestion by dropping packets. However, when ECN is successfully negotiated, an ECN-aware router may set a mark in the IP header instead of dropping a packet in order to signal impending congestion. The receiver of the packet echoes the congestion indication to the sender, which must react as though a packet was dropped. Some outdated or buggy network equipment may drop packets with ECN bits set, rather than ignoring the bits.

ECN functionality can be used to perform end-to-end rate adaptation between user equipment or devices (UEs) in a wireless network. However, if the transport network or devices in it does not properly support ECN functionality, the terminals will have to disable ECN and the UEs will not be able to perform rate adaptation.

SUMMARY OF THE INVENTION

Certain embodiments contemplate an interworking gateway for controlling data congestion comprising a processor. The processor may be configured to: receive a first plurality of messages from a first device, the first plurality of messages in compliance with a first congestion control mode, the first congestion control mode comprising at least one of sender-driven or receiver-driven congestion control; receive a second plurality of messages from a second device, the second plurality of messages in compliance with a second congestion control mode, the second congestion control mode comprising one of sender-driven or receiver-driven congestion control; and emulate either the first or the second congestion control mode when communicating messages from one of the first or second devices to the other of the first or second devices.

In some embodiments, receiving the first plurality of messages comprises receiving at least one of an ECN feedback message or a rate request message from the first device to the second device. In some embodiments, the processor further configured to modify the at least one of an ECN feedback message or a rate request message and resending data received at a first data rate from the first or second device to the other first or second device at a second data rate. In some embodiments, the first data rate and the second data rate are different. In some embodiments, the at least one of an ECN feedback message or a rate request message comprises an ECN feedback message and where modifying the at least one of an ECN feedback message or a rate request message comprises transmitting a rate request message, the rate request message generated based on the ECN feedback message. In some embodiments, the ECN feedback message is compliant with a sender congestion control mode and the transmitted rate request message is compliant with a receiver driven congestion control mode. In some embodiments, the processor further configured to receive a message from the first device, the message comprising a congestion encountered marking on a receiver driven congestion control link. In some embodiments, the processor is further configured to transmit a message to the second device, the message comprising a congestion encountered marking on a sender driven congestion control link. In some embodiments, the at least one of an ECN feedback message or a rate request message comprises a rate request message and where modifying the at least one of an ECN feedback message or a rate request message comprises intercepting and not transmitting the rate request message to the second device. In some embodiments, the rate request message is compliant with a receiver driven congestion control mode and the transmitted ECN congestion message is compliant with a sender driven congestion control mode. In some embodiments, the at least one of an ECN feedback message or a rate request message comprises a rate request message and where modifying the at least one of an ECN feedback message or a rate request message comprises transmitting an ECN feedback message, the ECN feedback message generated based on the rate request message. In some embodiments, the rate request message is compliant with a receiver driven congestion control mode and the transmitted ECN congestion message is compliant with a sender driven congestion control mode.

Certain embodiments contemplate a method for controlling data congestion, the method comprising: receiving a first plurality of messages from a first device, the first plurality of messages in compliance with a first congestion control mode, the first congestion control mode comprising at least one of sender-driven or receiver-driven congestion control; receiving a second plurality of messages from a second device, the second plurality of messages in compliance with a second congestion control mode, the second congestion control mode comprising one of sender-driven or receiver-driven congestion control, wherein the first congestion control mode is not operable with the second congestion control mode; and emulating either the first or the second congestion control mode when communicating messages from one of the first or second devices to the other of the first or second devices. The method may be implemented on an interworking gateway device comprising one or more processors.

In some embodiments, receiving the first plurality of messages comprises receiving at least one of an ECN feedback message or a rate request message from the first device to the second device. In some embodiments, the method further comprises modifying the at least one of an ECN feedback message or a rate request message and resending data received at a first data rate from the first or second device to the other first or second device at a second data rate. In some embodiments, the first data rate and the second data rate are different. In some embodiments, the at least one of an ECN feedback message or a rate request message comprises an ECN feedback message and where modifying the at least one of an ECN feedback message or a rate request message comprises transmitting a rate request message, the rate request message generated based on the ECN feedback message. In some embodiments, the ECN feedback message is compliant with a sender congestion control mode and the transmitted rate request message is compliant with a receiver driven congestion control mode. In some embodiments, the method further comprises receiving a message from the first device, the message comprising a congestion encountered marking on a receiver driven congestion control link. In some embodiments, the method further comprises transmitting a message to the second device, the message comprising a congestion encountered marking on a sender driven congestion control link. In some embodiments, at least one of an ECN feedback message or a rate request message comprises a rate request message and modifying the at least one of an ECN feedback message or a rate request message comprises intercepting and not transmitting the rate request message to the second device. In some embodiments, the rate request message is compliant with a receiver driven congestion control mode and the transmitted ECN congestion message is compliant with a sender driven congestion control mode. In some embodiments, the at least one of an ECN feedback message or a rate request message comprises a rate request message and modifying the at least one of an ECN feedback message or a rate request message comprises transmitting an ECN feedback message, the ECN feedback message generated based on the rate request message. In some embodiments, the rate request message is compliant with a receiver driven congestion control mode and the transmitted ECN congestion message is compliant with a sender driven congestion control mode.

Certain embodiments contemplate a non-transitory computer-readable medium having stored thereon instructions configured to cause one or more computer systems to: receive a first plurality of messages from a first device, the first plurality of messages in compliance with a first congestion control mode, the first congestion control mode comprising at least one of sender-driven or receiver-driven congestion control; receive a second plurality of messages from a second device, the second plurality of messages in compliance with a second congestion control mode, the second congestion control mode comprising one of sender-driven or receiver-driven congestion control, wherein the first congestion control mode is not operable with the second congestion control mode; and emulate either the first or the second congestion control mode when communicating messages from one of the first or second devices to the other of the first or second devices.

In some embodiments, to receive the first plurality of messages comprises receiving at least one of an ECN feedback message or a rate request message from the first device to the second device. In some embodiments, the instructions further cause the one or more computer systems to: modify the at least one of an ECN feedback message or a rate request message and resend data received at a first data rate from the first or second device to the other first or second device at a second data rate. In some embodiments, the first data rate and the second data rate are different. In some embodiments, the at least one of an ECN feedback message or a rate request message comprises an ECN feedback message and where modifying the at least one of an ECN feedback message or a rate request message comprises transmitting a rate request message, the rate request message generated based on the ECN feedback message. In some embodiments, the ECN feedback message is compliant with a sender congestion control mode and the transmitted rate request message is compliant with a receiver driven congestion control mode. In some embodiments, the instructions further cause the one or more computer systems to receive a message from the first device, the message comprising a congestion encountered marking on a receiver driven congestion control link. In some embodiments, the instructions further cause the computer systems to transmit a message to the second device, the message comprising a congestion encountered marking on a sender driven congestion control link. In some embodiments, the at least one of an ECN feedback message or a rate request message comprises a rate request message and where modifying the at least one of an ECN feedback message or a rate request message comprises intercepting and not transmitting the rate request message to the second device. In some embodiments, the rate request message is compliant with a receiver driven congestion control mode and the transmitted ECN congestion message is compliant with a sender driven congestion control mode. In some embodiments, the at least one of an ECN feedback message or a rate request message comprises a rate request message and where modifying the at least one of an ECN feedback message or a rate request message comprises transmitting an ECN feedback message, the ECN feedback message generated based on the rate request message. In some embodiments, the rate request message is compliant with a receiver driven congestion control mode and the transmitted ECN congestion message is compliant with a sender driven congestion control mode.

Certain embodiments contemplate an interworking gateway for controlling data congestion comprising: means for receiving a first plurality of messages from a first device, the first plurality of messages in compliance with a first congestion control mode, the first congestion control mode comprising at least one of sender-driven or receiver-driven congestion control; means for receiving a second plurality of messages from a second device, the second plurality of messages in compliance with a second congestion control mode, the second congestion control mode comprising one of sender-driven or receiver-driven congestion control, wherein the first congestion control mode is not operable with the second congestion control mode; and means for emulating either the first or the second congestion control mode when communicating messages from one of the first or second devices to the other of the first or second devices.

In some embodiments the means for receiving a first plurality of messages comprises a receiver, the means for receiving a second plurality of messages comprises a receiver, and the means for emulating comprises a computer system. In some embodiments the interworking gateway further comprising means for modifying the at least one of an ECN feedback message or a rate request message and resending data received at a first data rate from the first or second device to the other first or second device at a second data rate. In some embodiments, the at least one of an ECN feedback message or a rate request message comprises an ECN feedback message and wherein the means for modifying the at least one of an ECN feedback message or a rate request message is configured to transmit a rate request message, the rate request message generated based on the ECN feedback message. In some embodiments, the interworking gateway further comprises means for receiving a message from the first device, the message comprising a congestion encountered marking on a receiver driven congestion control link. In some embodiments, the interworking gateway further comprises means for transmitting a message to the second device, the message comprising a congestion encountered marking on a sender driven congestion control link. In some embodiments, the at least one of an ECN feedback message or a rate request message comprises a rate request message and wherein the means for modifying the at least one of an ECN feedback message or a rate request message is configured to transmit an ECN feedback message, the ECN feedback message generated based on the rate request message. In some embodiments, the rate request message is compliant with a receiver driven congestion control mode and the transmitted ECN congestion message is compliant with a sender driven congestion control mode.

BRIEF DESCRIPTION OF THE DRAWINGS

The present application may be more fully appreciated in connection with the following detailed description taken in conjunction with the accompanying drawings, wherein:

FIG. 2 illustrates details of a wireless communications system having multiple cells.

FIG. 9 illustrates details of sender and receiver driven ECN congestion control, particularly a first example coordinating sender-driven ECN congestion and a second example coordinating receiver-driven ECN congestion.

DETAILED DESCRIPTION

Figure 1:
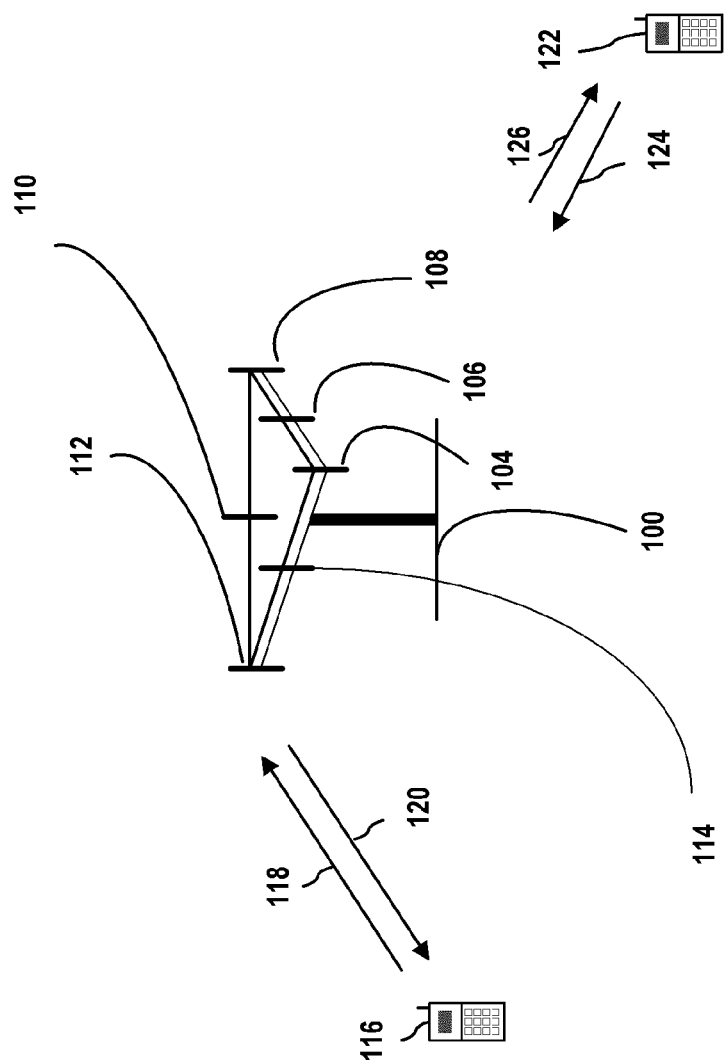
FIG. 1 illustrates details of a wireless communications system.

Various aspects and features of the disclosure are further described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Systems and methods are described to facilitate processing and management of explicit congestion notification (ECN) within and across disparate devices, networks, configurations, and protocols. The subject systems and methods may be used to provide receiver and/or sender driven rate control ECN functionality, which may be further enhanced through use of an interworking gateway, such as a Multimedia Resource Function Processor (MRFP).

In one aspect, messaging, as described further herein, may be used to facilitate coordination of devices such as terminals to perform ECN functionality, which may be coordinated between sender and receiver driven congestion control. In some implementations, an interworking gateway function may be provided within an operator's network and/or between the operator's network and other networks, which may serve as an ECN end-point to coordinate congestion control between receiver and sender driven control. The gateway function may be implemented in an interworking gateway device as described herein, or may be incorporated in other elements of a network, such as in components comprising a core network. In some implementations, the other network may include two or more disparate networks, each of which may be controlled by separate operators.

In various embodiments, the techniques and apparatus described herein may be used in wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably. In addition, the techniques and apparatus described herein may be used for interconnection between wired networks and between wired and wireless communication networks, as well as in interconnection between two or more wired or wireless communication networks.

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

The word "exemplary" is used herein to mean "serving as an example, instance, or illustration." Any aspect and/or embodiment described herein as "exemplary" is not necessarily to be construed as preferred or advantageous over other aspects and/or embodiments. In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In 3GPP LTE, a mobile station or device may be referred to as a "user device" or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Attention is now directed to FIG. 1, which illustrates details of an implementation of a multiple access wireless communication system, which may be part of an LTE or other communication system on which ECN congestion control related functionality as described herein is implemented. An evolved Node B (eNB) 100 (also known as an access point or AP) may include multiple antenna groups, one including antennas 104 and 106, another including antennas 108 and 110, and an additional group including antennas 112 and 114. In FIG. 1, only two antennas are shown for each antenna group, however, more or fewer antennas may be utilized for each antenna group. A user equipment (UE) 116 (also known as an access terminal or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 is in communication with antennas 106 and 108, where antennas 106 and 108 transmit information to UE 122 over forward link 126 and receive information from access terminal 122 over reverse link 124. UEs 116 and 122, as well as others (not shown) may be configured to implement ECN functionality as described herein.

In a frequency division duplex (FDD) system, communication links 118, 120, 124 and 126 may use different frequencies for communication. For example, forward link 120 may use a different frequency than that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 100 utilize beam-forming in order to improve the signal-to-noise ratio of forward links for the different access terminals, such as UEs 116 and 122. Also, an eNB using beam-forming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology.

FIG. 2 illustrates details of an implementation of a multiple access wireless communication system 200, such as an LTE system, on which ECN congestion control related functionality as described herein may be implemented. The multiple access wireless communication system 200 may include multiple cells, including cells 202, 204, and 206. In one aspect of the system 200, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 can include several wireless communication devices, e.g., user equipment or UEs, which can be in communication with one or more sectors of each cell 202, 204 or 206. For example, UEs 230 and 232 can be in communication with eNB 242, UEs 234 and 236 can be in communication with eNB 244, and UEs 238 and 240 can be in communication with eNB 246. The cells and associated base stations may be coupled to a system controller 250, which may be part of a core or backhaul network, such as may be used to perform functions as further described herein related to subframe partition allocation and configuration.

Overview of the Embodiments

Certain of the present embodiments contemplate a method for coordinated ECN congestion control using the SDP protocol. Particularly, these embodiments contemplate an exchange between two terminals wherein each terminal specifies its operational constraints and/or preferences regarding the modes for sending and receiving data. These embodiments may be implemented as software, hardware, or firmware on any terminal device as further disclosed herein.

Certain of the present embodiments also contemplate operations performed by an interworking gateway to facilitate communication between terminals operating in incompatible congestion control modes. The interworking gateway may receive messages from a first terminal and modify, substitute, or block these messages to facilitate compatible communication with a second terminal. Embodiments of the interworking gateway may be implemented as software, hardware, or firmware as further disclosed herein.

Structure of the Terminal Devices

Figure 3:
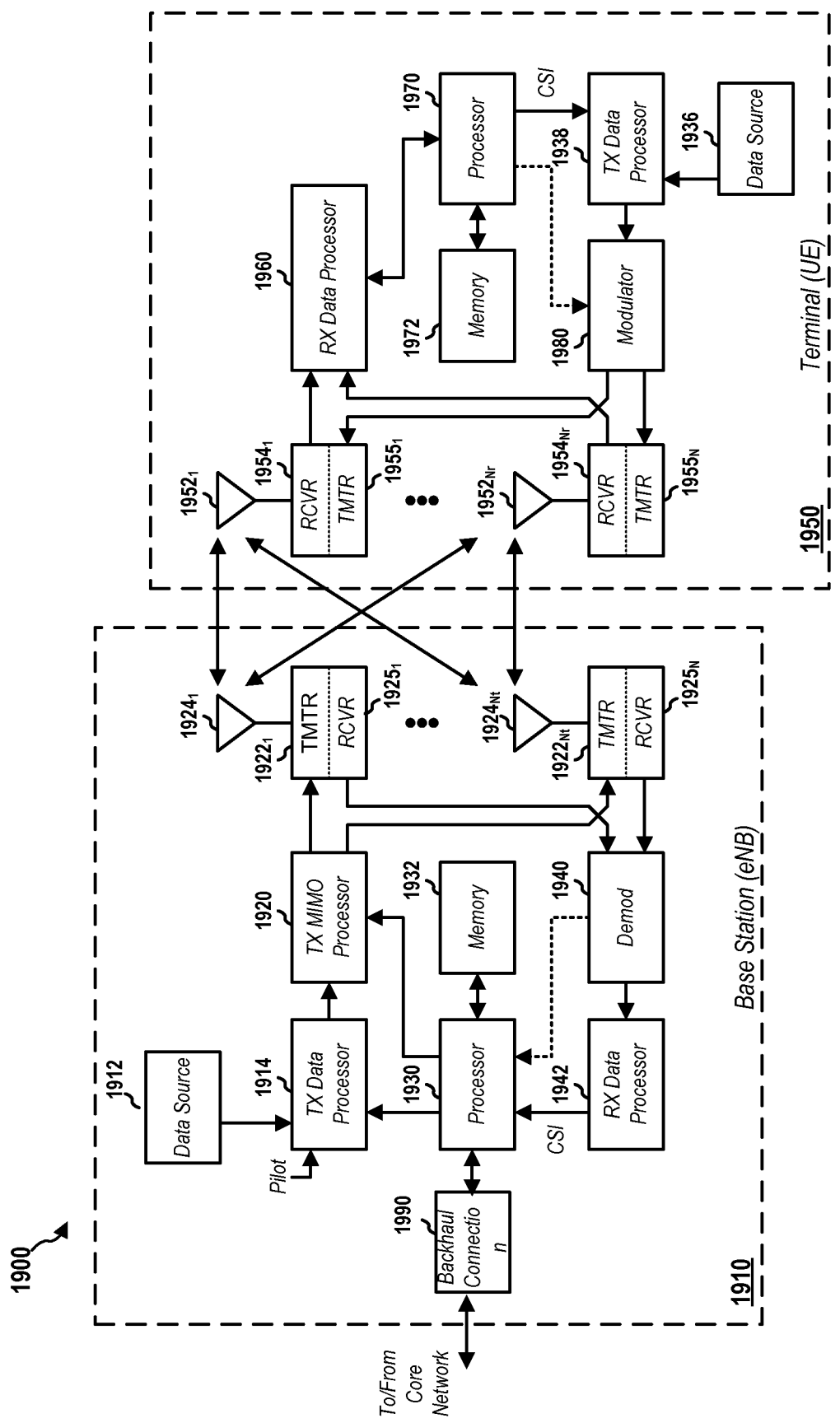
FIG. 3 illustrates details of an embodiment of a terminal and base station.

FIG. 3 illustrates a block diagram of an embodiment of a base station 1910 (e.g., an eNB or HeNB) and a terminal 1950 (i.e., a terminal, AT or UE) in an example LTE communication system 1900, which may be configured to provide ECN functionality as described herein. These components may be configured to implement all or part of the processing illustrated subsequently herein.

Various functions may be performed in the processors and memories as shown in base station 1910 (and/or in other components not shown), such as sending and receiving ECN messaging, as well as other functions as described previously herein. Any of base stations 530 or 1230 may comprise the components illustrated in base station 1910. UE 1950 may include one or more modules to receive signals from base station 1910 to, for example, send and receive ECN messaging and/or adjust operation in accordance with the various ECN-related functions described herein, including rate adaptation.

Figure 4:
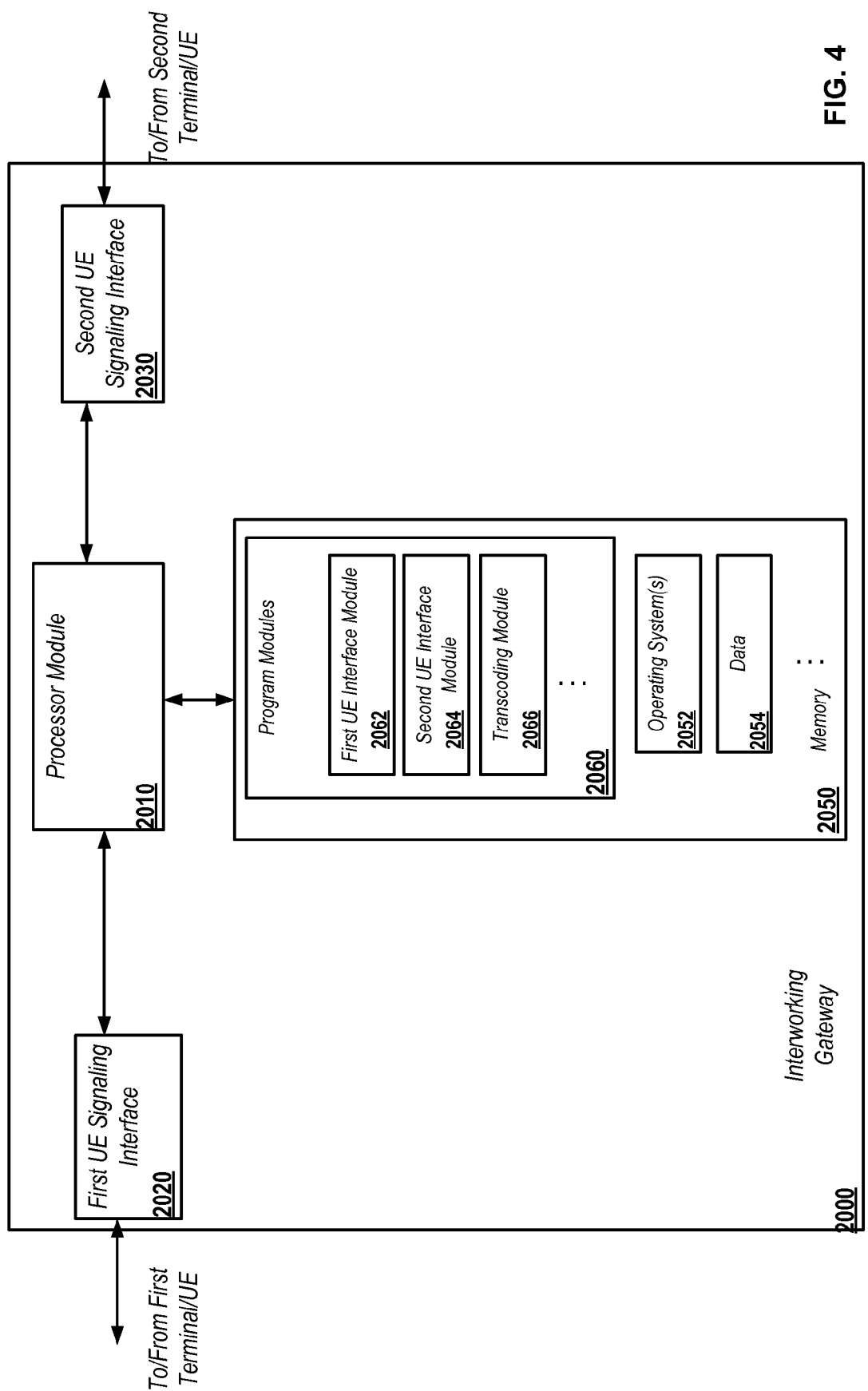
FIG. 4 illustrates details of an embodiment of an interworking gateway.

In one embodiment, base station 1910 may adjust output transmissions in response to information received from UE 1950 or from backhaul signaling from another base station or a core network (not shown in FIG. 3) as described previously herein. This adjustment may be performed using one or more components (or other components not shown) of base station 1910, such as processors 1914, 1930 and memory 1932. Base station 1910 may also include a transmit module including one or more components (or other components not shown) of eNB 1910, such as transmit modules 1924. Base station 1910 may include an interference cancellation module including one or more components (or other components not shown), such as processors 1930, 1942, demodulator module 1940, and memory 1932 to provide interference cancellation functionality. Base station 1910 may include a subframe partition coordination module including one or more components (or other components not shown), such as processors 1930, 1914 and memory 1932 to perform subframe partition functions as described previously herein and/or manage the transmitter module based on the subframe partition information. Base station 1910 may also include a control module for controlling receiver functionality. Base station 1910 may include a network connection module 1990 to provide networking with other systems, such as backhaul systems in the core network or other components as shown in FIGS. 3 and 4.

Likewise, UE 1950 may include a receive module including one or more components of UE 1950 (or other components not shown), such as receivers 1954. UE 1950 may also include a signal information module including one or more components (or other components not shown) of UE 1950, such as processors 1960 and 1970, and memory 1972. In one embodiment, one or more signals received at UE 1950 are processed to estimate channel characteristics, power information, spatial information and/or other information regarding eNBs, such as base station 1910 and/or other base stations (not shown). Measurements may be performed during semi-static subframes that are noticed to UE 1950 by base station 1910. Memories 1932 and 1972 may be used to store computer code for execution on one or more processors, such as processors 1960, 1970 and 1938, to implement processes associated with channel measurement and information, power level and/or spatial information determination, cell ID selection, inter-cell coordination, interference cancellation control, as well as other functions related to subframe allocation, interlacing, and associated transmission and reception as are described herein.

In operation, at the base station 1910, traffic data for a number of data streams may be provided from a data source

1912 to a transmit (TX) data processor 1914, where it may be processed and transmitted to one or more UEs 1950. The transmitted data may be controlled as described previously herein so as to provide interlaced subframe transmissions and/or perform associated signal measurements at one or more UEs 1950.

In one aspect, each data stream is processed and transmitted over a respective transmitter sub-system (shown as transmitters $1922_1$-$1922_m$) of base station 1910. TX data processor 1914 receives, formats, codes, and interleaves the traffic data for each data stream based on a particular coding scheme selected for that data stream so as to provide coded data. In particular, base station 1910 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 1914 as shown in FIG. 3 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 1930 based on instructions stored in memory 1932, or in other memory or instruction storage media of UE 1950 (not shown).

The modulation symbols for all data streams may then be provided to a TX MIMO processor 1920, which may further process the modulation symbols (e.g., for OFDM implementation). TX MIMO processor 1920 may then provide Nt modulation symbol streams to $N_t$ transmitters (TMTR) $1922_1$ through $1922_{Nt}$. The various symbols may be mapped to associated RBs for transmission.

TX MIMO processor 1930 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 . . . $b_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1x1+B2x2+$BN_s$x$N_s$, where $N_s$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $1922_1$ through $1922_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters $1922_1$ through $1922_{Nt}$ are then transmitted from $N_t$ antennas $1924_1$ through $1924_{Nt}$, respectively.

At UE 1950, the transmitted modulated signals are received by $N_r$ antennas $1952_1$ through $1952_{Nr}$ and the received signal from each antenna 1952 is provided to a respective receiver (RCVR) $1954_1$ through $1952_{Nr}$. Each receiver 1954 conditions (e.g., filters, amplifies and downconverts) a respective received signal, digitizes the conditioned signal to provide samples, and further processes the samples to provide a corresponding "received" symbol stream.

An RX data processor 1960 then receives and processes the $N_r$ received symbol streams from $N_r$ receivers $1954_1$ through $1952_{Nr}$ based on a particular receiver processing technique so as to provide $N_s$ "detected" symbol streams so at to provide estimates of the $N_s$ transmitted symbol streams. The RX data processor 1960 then demodulates, deinterleaves, and decodes each detected symbol stream to recover the traffic data for the data stream. The processing by RX data processor 1960 is typically complementary to that performed by TX MIMO processor 1920 and TX data processor 1914 in base station 1910.

A processor 1970 may periodically determine a precoding matrix for use as is described further below. Processor 1970 may then formulate a reverse link message that may include a matrix index portion and a rank value portion. In various aspects, the reverse link message may include various types of information regarding the communication link and/or the received data stream. The reverse link message may then be processed by a TX data processor 1938, which may also receive traffic data for a number of data streams from a data source 1936 which may then be modulated by a modulator 1980, conditioned by transmitters $1954_1$ through $1954_{Nr}$, and transmitted back to base station 1910. Information transmitted back to base station 1910 may include power level and/or spatial information for providing beamforming to mitigate interference from base station 1910.

At base station 1910, the modulated signals from UE 1950 are received by antennas 1924, conditioned by receivers 1922, demodulated by a demodulator 1940, and processed by a RX data processor 1942 to extract the message transmitted by UE 1950. Processor 1930 then determines which precoding matrix to use for determining beamforming weights, and then processes the extracted message.

Structure of the Interworking Gateway

FIG. 4 illustrates details of an embodiment of an interworking gateway 2000, which may correspond with the gateways shown in FIGS. 12-16. In particular, gateway 2000 may include one or more processor module 2010, along with memory 2050, which may be configured to store program modules for implementing the gateway functionality described herein, such as with respect to FIGS. 15, 17-20. The gateway may also include interfaces 2020 and 2030 between the networks associated with and intermediate to first and second terminals as described previously herein. The gateway 2000 may further include modules to facilitate interworking between sender driven and receiver driven ECN congestion control, and may also include transcoding functionality, such as is described with respect to FIG. 17.

ECN Congestion Overview

Figure 5:
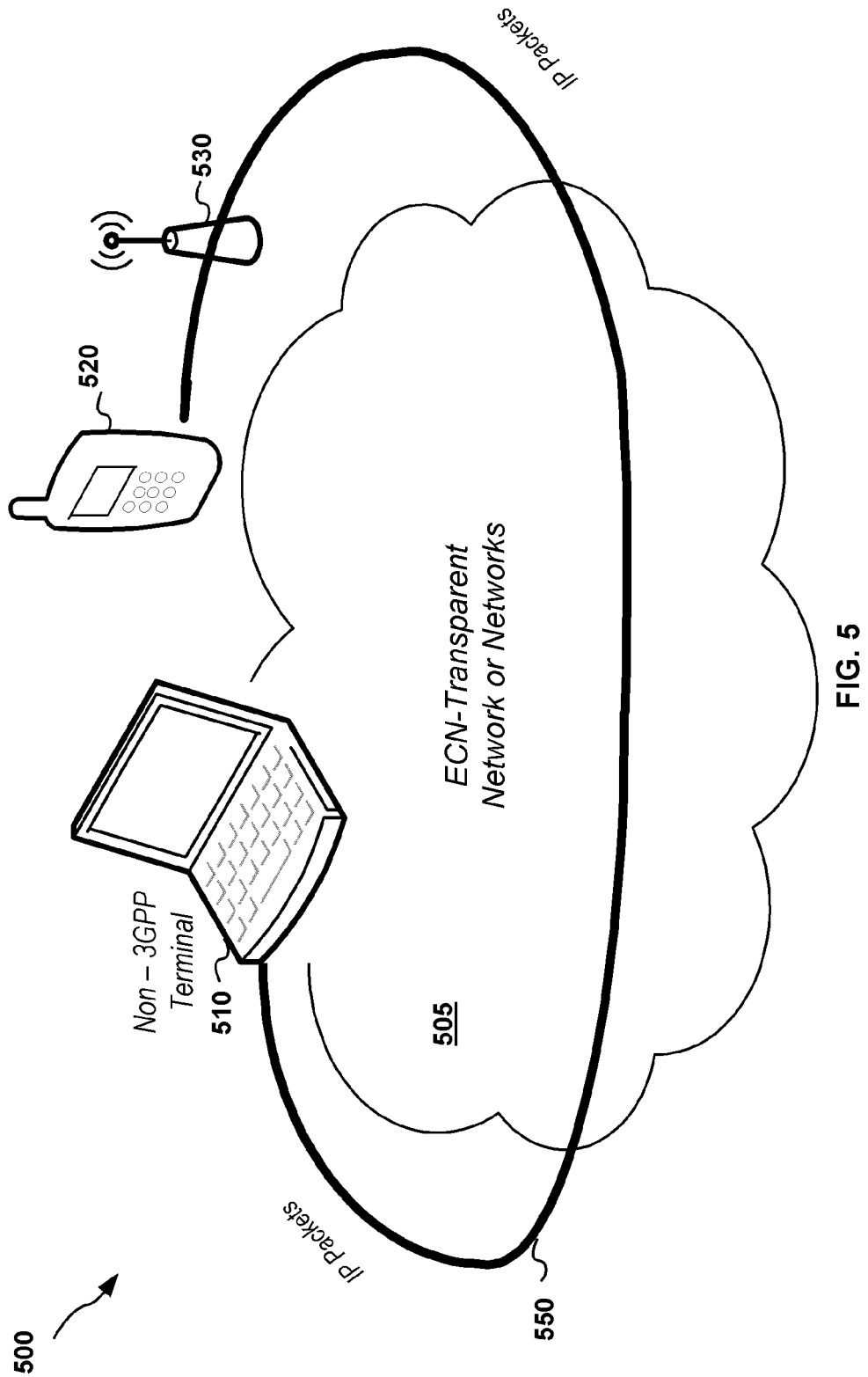
FIG. 5 illustrates details of a network topology between two terminals in an ECN capable network.

Attention is now directed to FIG. 5, which illustrates details of a communications system 500. System 500 may comprise a network 505 associated with a particular operator, or may include multiple networks (not shown). Within network 505, a first terminal device 520, such as a UE, may be in communication with a second terminal device, such as terminal 510, via link 550. In some implementations, terminal 510 may be a non-3GPP device, however, in other implementations terminal 510 may be a 3GPP device. In a typical communication between the devices, a signal may be sent from terminal 520 to terminal 510, and may include transmission through a node such as a base station 530, as well as other elements of network 505, such as, for example, routers, switches, and/or other components. In one example, these components comprise a core network of a particular operator. In other examples, these components comprise core network elements of one or more operators. During transmission between terminals 510 and 520, congestion may be encountered. The transmissions may be based on the Internet Protocol (IP) and may be IP packets. In networks that support Explicit Congestion Notification (ECN), packets may be marked or tagged accordingly.

ECN functionality within an IP network operates by adding certain bits to the IP header to encode different codepoints. For example, the two least significant (i.e., right-most) bits of a DiffSery field in the IP header may be encoded as follows: 00: Non ECN-Capable Transport; 10: ECN Capable Transport ECT(0); 01: ECN Capable Transport ECT(1); 11: Congestion Encountered (CE). Where two endpoint terminals each support ECN they may each mark their packets with ECT(0) or ECT(1) to indicate that they are capable of ECN transport. If a packet from one of the terminals traverses a queue supporting early congestion detection, such as an Active Queue Management (AQM) queue, the codepoint may be changed to CE instead of dropping the packet. This is also known as "marking" and may be used to inform the receiving endpoint of impending congestion. At the receiving endpoint, this congestion indication may be handled by an upper layer protocol (e.g., TCP) and may be echoed back to the transmitting node in order to direct the transmitting node to adjust, such as by reducing, its transmission rate.

When setting up communications, terminals 510 and 520 may negotiate how they will use ECN. The ECN functionality supported by the terminals may be sender driven, receiver driven, and some terminal devices may support both sender and receiver driven types. In some instances, the terminals may support neither sender nor receiver driven congestion types. Negotiation may involve, as further described herein, determining whether transmissions are sender or receiver driven, or in some cases a hybrid configuration comprising both sender and receiver driven aspects. In addition, in some implementations, an interworking gateway may be used to facilitate ECN congestion functionality when terminals operating in incompatible congestion modes communicate with one another.

In addition, one or both terminals may provide rate adaptation feedback during a communication session. For example, if one of the terminals receives congestion encountered (CE) markings in packets provided from other UE's the terminal may read the CE-codepoint marking information to determine an appropriate rate and send a Temporary Maximum Bit Rate Request (TMMBR), CMR or other rate request data or message to the sending UE. The TMMBR, CMR or other rate request data or message may request that the sending UE adjust the transmission rate (typically a lowered transmission rate) on its uplink. During a communication session UEs may also adjust the rate of media sent on paths to the other UEs to match a rate request limit (e.g., TMMBR).

Rate Request Message

Figure 6:
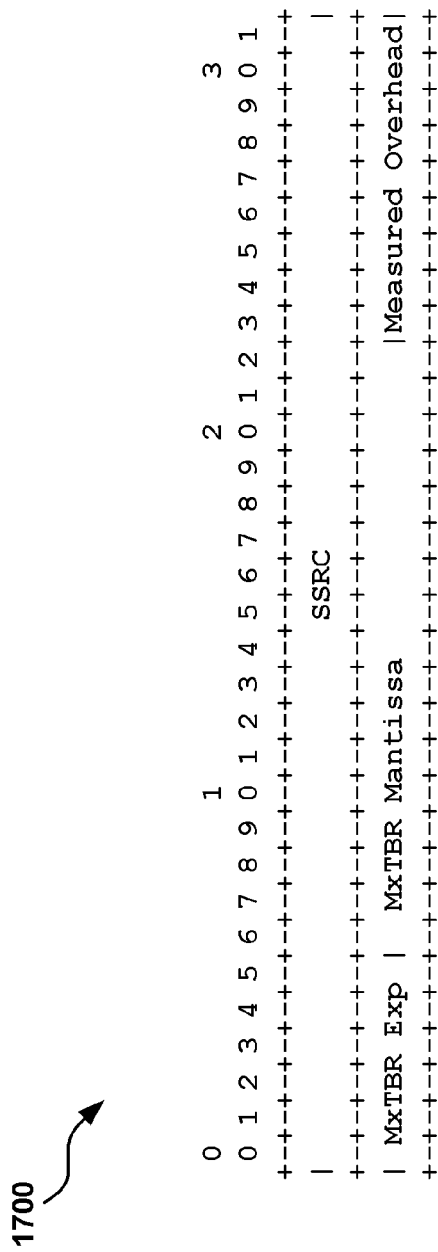
FIG. 6 illustrates details of an embodiment of a standardized rate request.

As mentioned above, one of the terminals may be configured to send a Temporary Maximum Bit Rate Request (TMMBR), CMR or other rate request data or message to another terminal in some implementations. The term rate request message as used herein will be understood to refer to any message sent from a first device containing information indicating a desired rate of data transmission from a second device. In some aspects the receiving device may be required to transmit at the desired rate indicated in the rate request message. In some aspects, the rate request message (e.g., the RTCP/RTP rate/mode request message) may be standardized. For example, a requirement may be imposed that terminals supporting RX driven congestion control support TMMBR messaging. When the congestion mode value recvonly is selected as the driver for congestion control, TMMBR should then be used. Standardizing use of TMMBR may be advantageous as use of other unspecified or undocumented rate request messages may cause confusion at the encoder. FIG. 6 illustrates an example TMMBR format for a rate request message.

ECN Feedback Message

Figure 7:
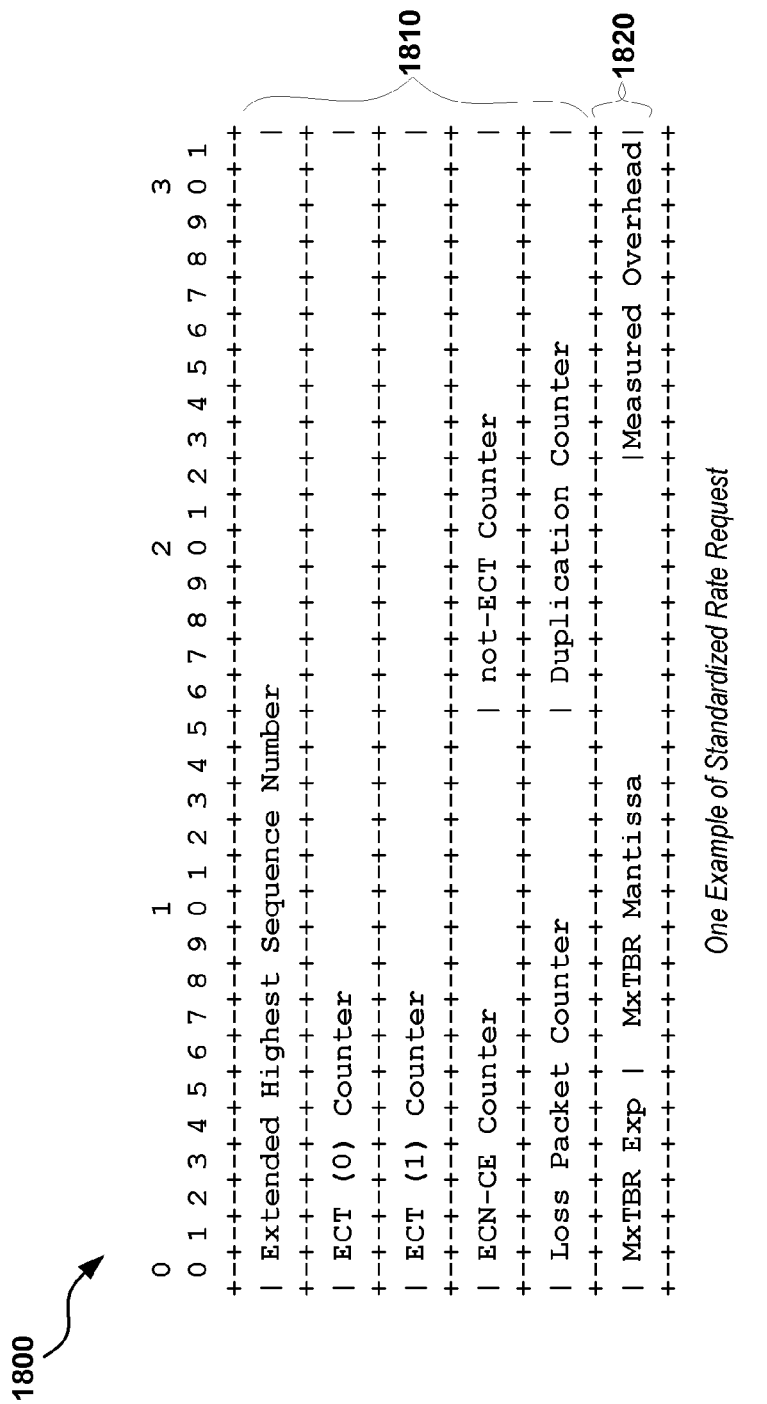
FIG. 7 illustrates details of an embodiment of an ECN congestion feedback message with added fields.

In some implementations, a generic rate request in an ECN feedback message may be used. FIG. 7 provides a general outline of one possible structure for an ECN feedback message. In certain aspects, the ECN feedback message is used passively, in that the message indicates experienced congestion, but does not mandate that the receiving terminal take any particular action. In some aspects, bits may be set in the message to indicate how much congestion was experienced as part of transmission.

Certain embodiments may combine rate request and ECN feedback information into a single packet. For example, the field (FCI) in an AVPF Feedback message may be populated to provide feedback information in conjunction with the message of FIG. 6. Conversely, rate request information may be included in the ECN feedback message of FIG. 7. In this example of an ECN feedback message, additional fields 1820 may be added to those shown in fields 1810.

SDP Protocol-Based Congestion Control

Figure 8:
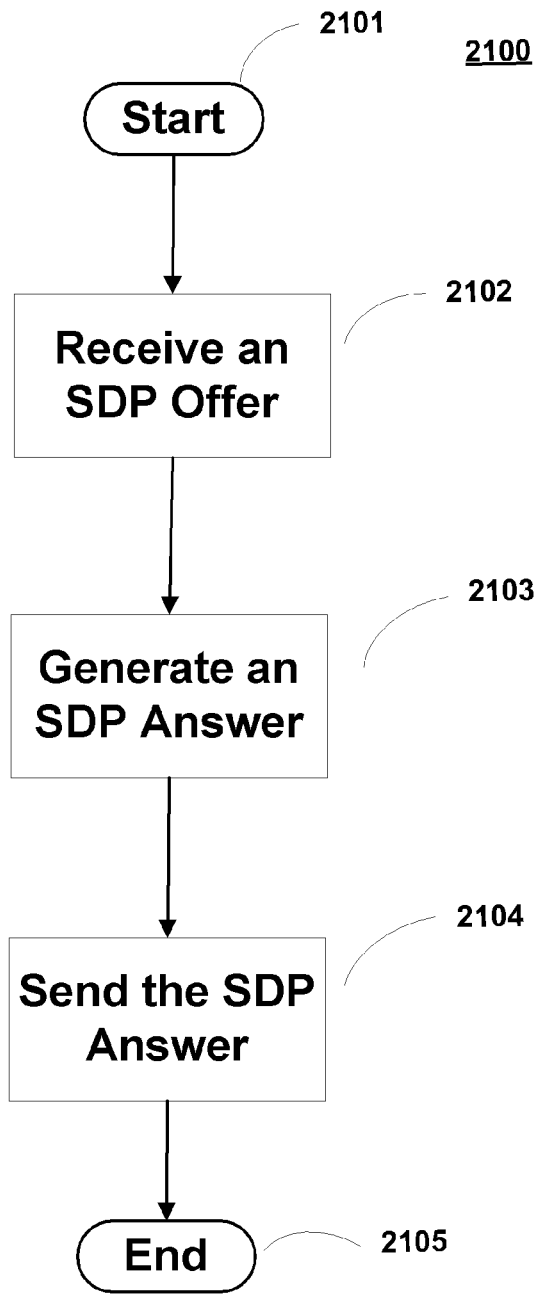
FIG. 8 illustrates a flow diagram for the general method by which one terminal device determines a congestion control mode using SDP.

FIG. 8 illustrates a flowchart of a method by which one terminal device determines a congestion control mode using SDP as described below in relation to FIGS. 9-14. Particularly, FIG. 8 illustrates a method for transmitting and receiving congestion control information as discussed below with respect to FIGS. 9-14 from the perspective of a terminal such as terminals 720-1020. One may imagine a converse process, pursuant to these figures for operation at terminals 710-1010. At block 2102 the terminal receives an SDP offer. The offer may comprise an IP packet containing an indicator specifying one of sender-driven or receiver-driven congestion control as discussed above. The indicator may reflect the congestion mode implemented by a device transmitting the SDP offer (such as terminal UE1), or a desired congestion control mode to be used by the receiving device. Next, at 2103, the terminal generates an SDP answer. The answer may likewise comprise an IP packet or similar structure and may contain an indicator or other parameters specifying the congestion control. The indicator in the SDP answer may likewise specify the congestion control mode of the transmitting device, or the desired mode of the recipient. Continuing to state 2104, the terminal may then send the SDP answer to the other terminal before the process ends.

Each of the above operations may be performed using various components depicted in FIG. 3, although one will readily recognize a plurality of alternative communication devices capable of performing these functions. For example, means for receiving an SDP offer may comprise receiver 1955 or any similar device configured to receive a signal. Means for generating an SDP answer may comprise a computer system such as processor 1970 and memory 1972. The generating means may be implemented as a microcontroller, firmware, hardware, software, or the like. Means for sending the SDP answer may comprise a transmitter 1954 or any similar device configured to transmit a signal. Transmitter 1954 may similarly comprise means for sending media. Transmitter 1954 and receiver 1955 in conjunction with processor 1970 and memory 1972 may comprise means for determining a first congestion control for a first direction of flow and a second congestion control for a second direction control. The means may likewise refer to software, firmware, or hardware modules which perform the recited function. These modules may reside in UEs, eNBs, interworking gateways or other network nodes. Although components of terminal 1950 are referred to above, one will readily recognize the corresponding components of devices such as base station 1910 may comprise structures performing the above-described functions.

SDP Protocol Example—Sender/Receiver Driven Control

FIG. 9 illustrates two examples of signaling for use in congestion control. Signaling diagram 600A illustrates an example of sender driven congestion control. In this example, a first transmit (Tx) terminal, such as a UE 610A, sends media 652A, such as Real Time Protocol (RTP) media, to a second receive (Rx) terminal, such as UE 620A. UE 620A may then send an ECN feedback message 654A to UE 610A. If the message is a Real Time Control Protocol (RTCP) ECN feedback message (i.e., indicative of congestion and desired sender congestion control), UE 610A may then choose to operate in sender driven ECN congestion control mode. UE 610A may then adapt the data rate based on UE 610A's determination regarding an appropriate rate. UE 610A's rate determination may be based on, for example, the amount of congestion experienced in the transmission of media 652A.

Figure 17:
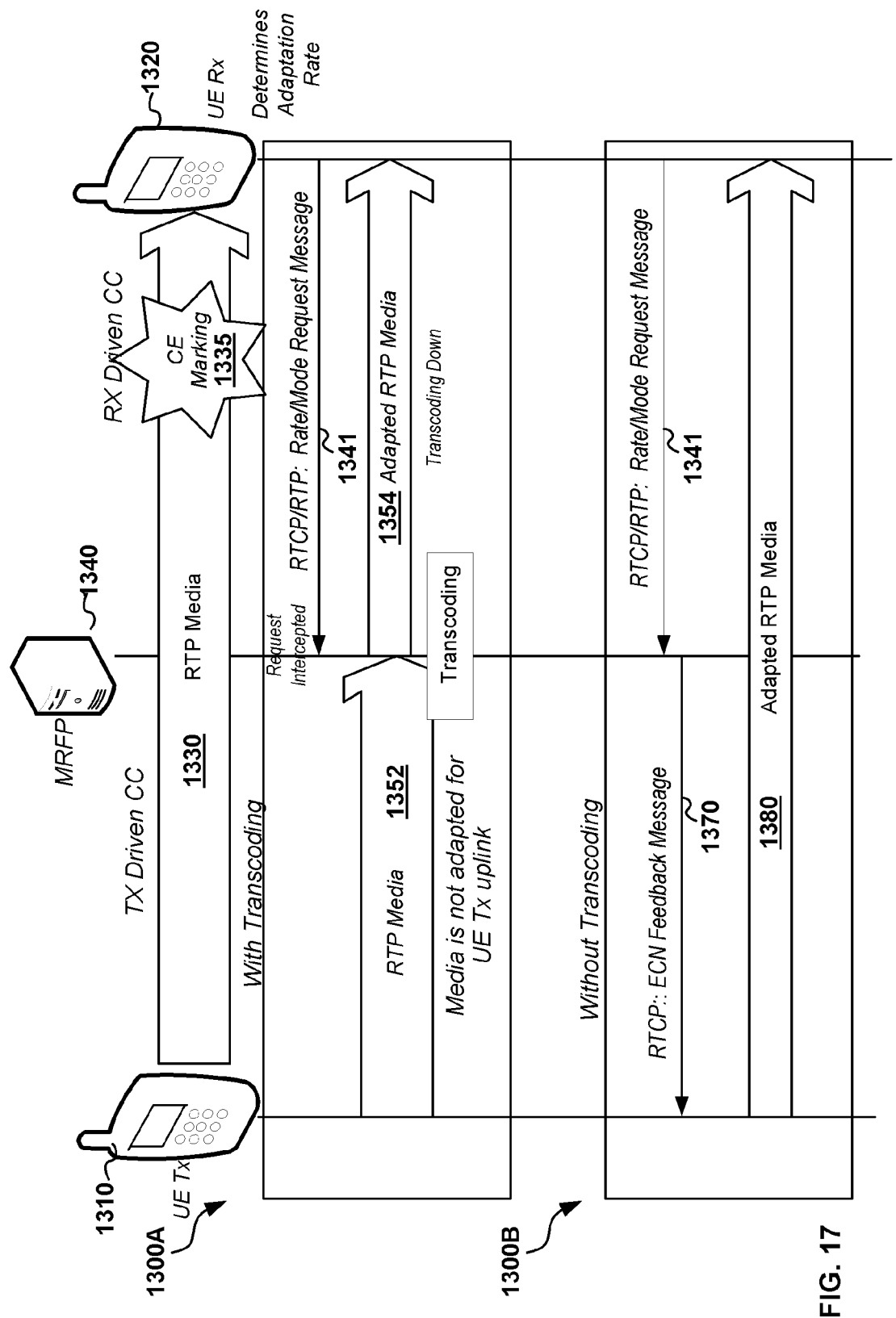
FIG. 17 illustrates an embodiment where an interworking gateway adapts the data rate to facilitate ECN congestion control between two terminals.

Signaling diagram 600B illustrates an example of receiver driven congestion control. In this example, a first terminal, such as UE 610B, sends media 652B, such as RTP media, to a second terminal, such as UE 620B. In this case, UE 620B may determine an adaptation rate, and in reply may send an RTCP/RTP rate/mode request message, such as, for example, is shown in FIG. 17. Upon receipt, UE 610B may then adapt the data rate of subsequently transmitted media based on the rate provided from UE 620B.

In either of the examples 600A or 600B, UEs 610A and 610B may communicate with corresponding UEs 620A and 620B, assuming each supports the corresponding sender or receiver driven ECN congestion control. However, in some cases, terminals supporting both types, or terminals supporting only particular types, or no types, may desire to communicate using ECN functionality. This may be performed as further described below, particularly in regards to the interworking gateway for congestion control.

In cases where receiver driven congestion control is used, the receiver of ECN-CE markings (e.g., marked packets) decides what rate the corresponding sender should use. This information may be provided using feedback signaling, such as in example 600B of FIG. 6. In particular, feedback may be sent via an RTC-APP message (Codec Mode Request or CMR) where Adaptive Multi Rate (AMR) VoIP is used. The message may use a mode request in RTP with an interleaved bundled payload format. Enhanced Variable Rate Codec (EVRC) VoIP may also be used. TMMBR may also be used for video. Other signaling mechanisms, such as specific signaling associated with a particular type of codec, may also be used. TMMBR is generically defined in Codec Control Messages for AVPF RFC 5104 for signaling.

Receiver driven congestion control may be advantageous under a variety of circumstances. For example, using receiver congestion control mode, the receiver and sender do not have to use ECN feedback messages. In addition, receiver driven congestion control may enable faster response and adaptation. Receiver congestion control may also be better for multicast adaptation as receivers with information about their supported downlink can request a rate they require.

However, there may be instances where receiver driven congestion control operation may be problematic, such as when the other terminal does not support that form of congestion control. Accordingly, in one aspect, congestion control may be performed on a per terminal basis as further described below. Session Description Protocol (SDP) is a format for describing streaming media initialization parameters. In particular, in accordance with one aspect, an SDP parameter may be used to indicate the "driver" of congestion control. SDP is used for describing multimedia communication sessions for the purposes of session announcement, session invitation, and parameter negotiation. SDP does not deliver media itself but is used for negotiation of media type, format, as well as other associated properties, between end points. The set of properties and parameters may be referred to as a session profile. SDP is designed to be extendable to support new media types and formats. An SDP session may include transmission of an SDP Offer along with receipt of an SDP Answer.

In certain aspects a parameter denoted herein as a "conctrl-driver", may be added to the existing parameters for use in implementing congestion signaling. In some embodiments, this parameter may take on the following congestion mode values: sendrecv, sendonly, and recvonly.

The value "sendrecv" indicates that the terminal sending the SDP Offer can support both receiver driven (rx-driven) and transmitter driven (tx-driven) congestion control. In this case, the receiving terminal may reply as supporting either sender only or receiver only congestion control. In cases where neither "sender only" nor "receiver only" control is supported, a default or null parameter, or other signaling may be used. In addition, while it may be possible for the second terminal to respond with the same parameter (i.e., sendrecv), this may create confusion. Certain aspects resolve such confusion via an interworking gateway as described subsequently herein.

The value "sendonly" indicates that the terminal does not send rate requests and/or does not process rate requests. A reply to a message containing the "sendonly" value may include the same parameter value or a default or null value. In cases where the second, replying terminal only supports receive only functionality, the incompatibility may be handled by an interworking gateway as described subsequently herein.

The value "recvonly" indicates that the terminal only sends rate requests and reacts to rate requests. In this case, the terminal does not send or react to ECN feedback messages. A reply to a message containing the "recvonly" value may include the same parameter value or a default or null value. In cases where the second, replying terminal only supports send only functionality, the incompatibility may be handled by an interworking gateway as described subsequently herein.

These parameters may be used in a session between two terminals, such as UEs, or other terminal devices, such as is shown in FIG. 7. In this example, as well as those shown in FIGS. 8 and 9, congestion control is configured per terminal, where the same congestion control is used in both directions.

SDP Protocol Example—Negotiating Receiver Driven Control

Figure 10:
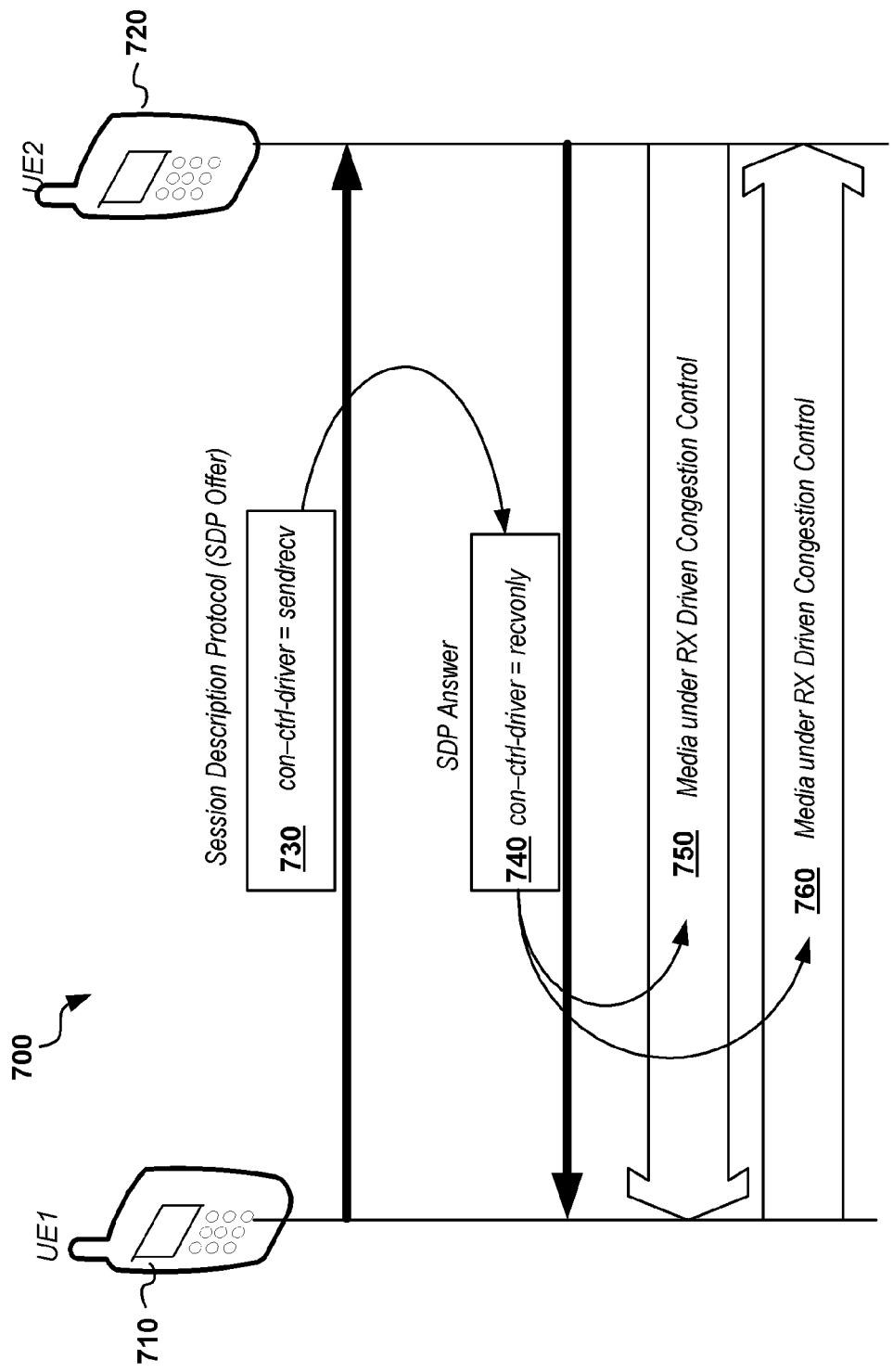
FIG. 10 illustrates details of an embodiment of SDP signaling to facilitate coordination of ECN congestion control modes between two terminals.

FIG. 10 illustrates an example SDP interaction 700 between a first terminal 710, such as UE1, and a second terminal 720, such as UE2. In this example, an SDP Offer may be sent from terminal 710 to terminal 720 with the parameter con-ctrl-dry set to sendrecv 730, i.e., indication that terminal 710 can support either mode. In this case, terminal 720 may respond in one of several ways. For example, terminal 720 may respond by sending, in the SDP Answer, the parameter value recvonly 740, in which case the terminal 720 is indicating that it can only support receiver driven ECN congestion control. In some cases, the terminal 720 may be able to support either mode but may choose, for example, to operate in a particular mode, such as recvonly, based on, for example, media, terminal or network conditions, or other factors.

Once the negotiation is completed, media 750 and 760 may then be sent between the terminals consistent with the negotiated receiver driven format.

SDP Protocol Example—Negotiating Sender Driven Control

Figure 11:
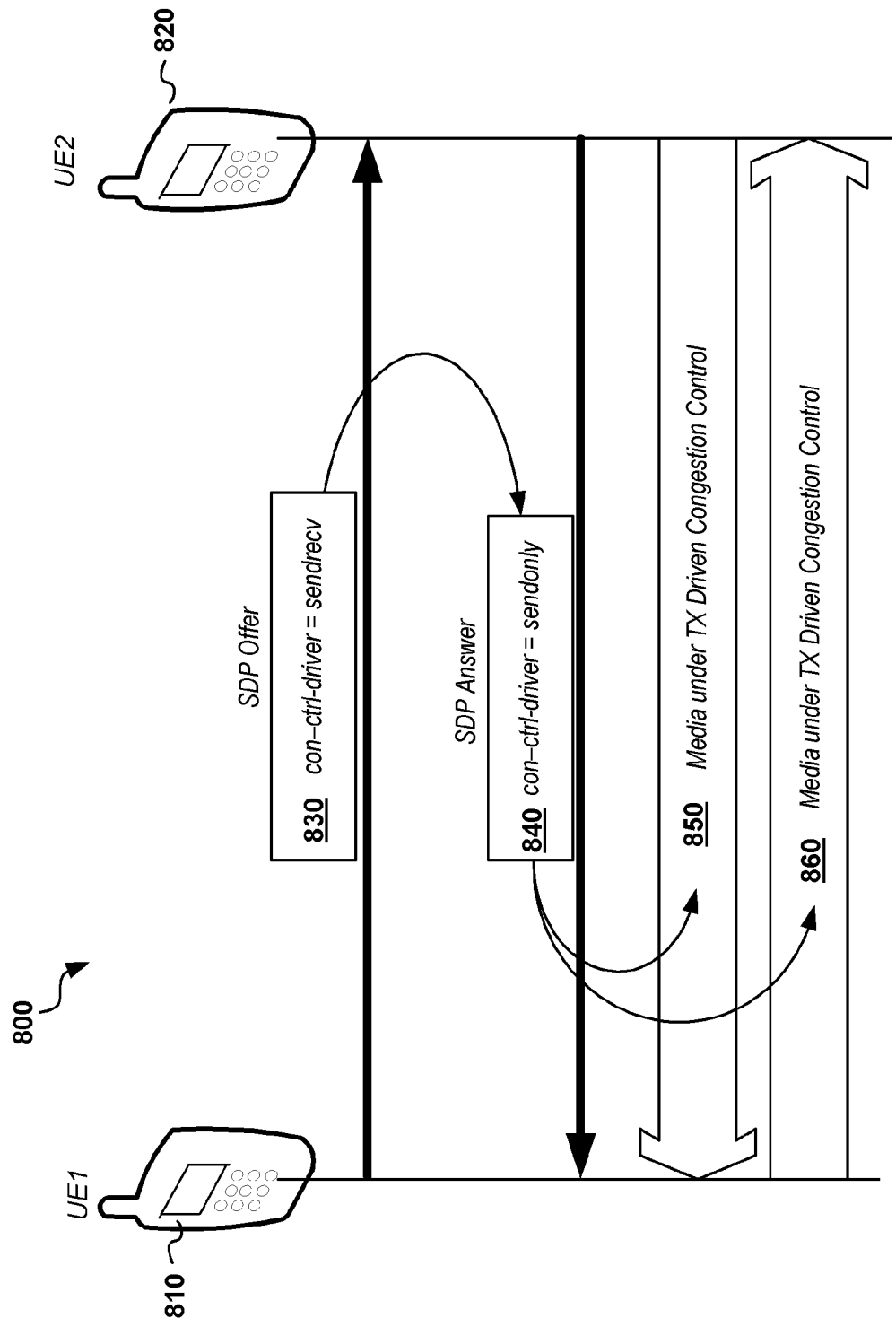
FIG. 11 illustrates ECN congestion signaling using a "sendonly" parameter to establish sender-driven congestion control between two terminals.

FIG. 11 illustrates another example interaction 800 where a terminal 810 sends the same parameter (i.e., sendrecv 830), but a second terminal 820 replies with the sendonly parameter 840. In this case, transmitter or sender driven ECN congestion control may be used with media 850 and 860

SDP Protocol Example—Congestion Control Unavailable

Figure 12:
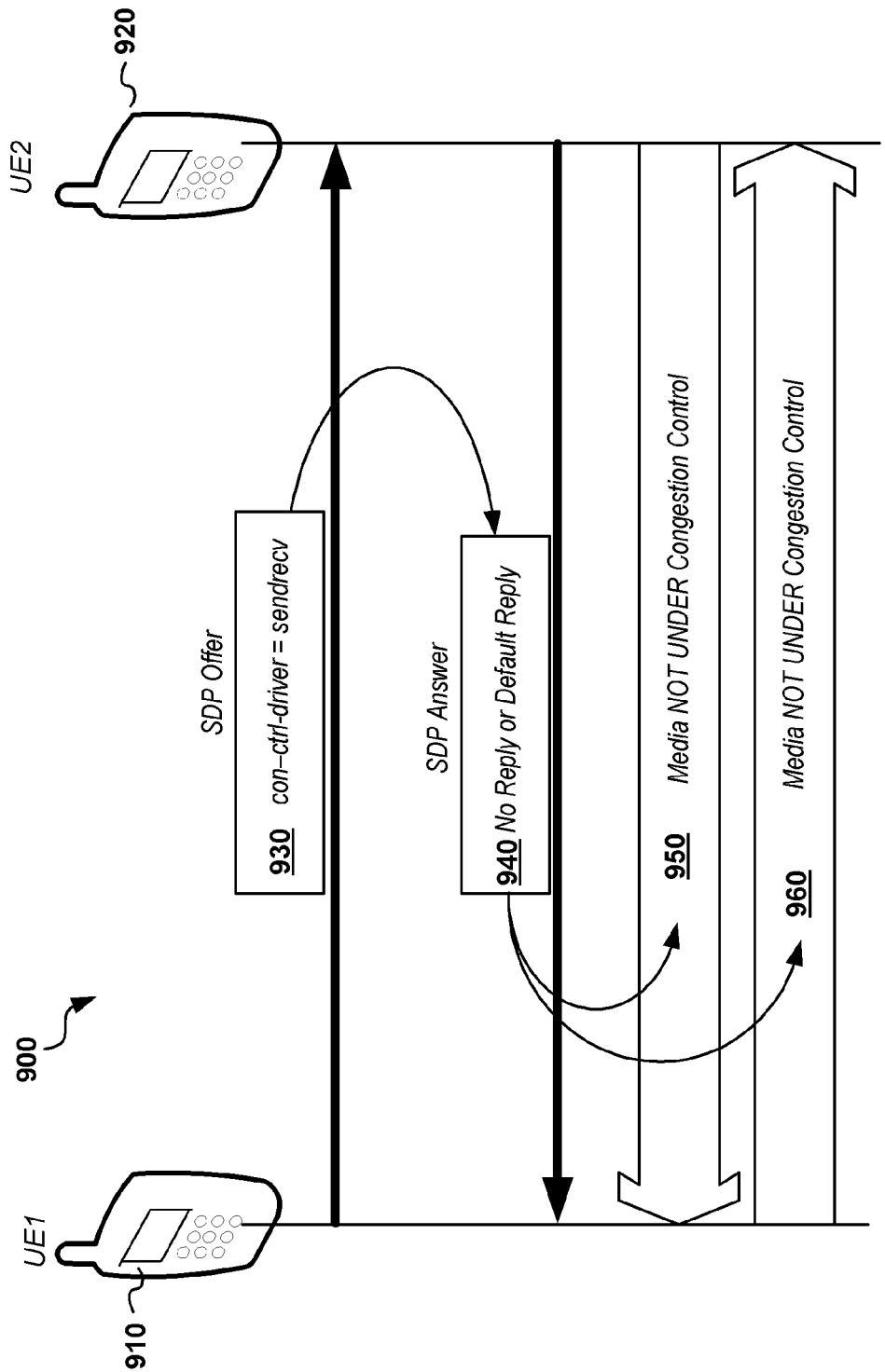
FIG. 12 illustrates ECN congestion signaling where one terminal sends a parameter indicating that ECN congestion control is not to be used.
Figure 13:
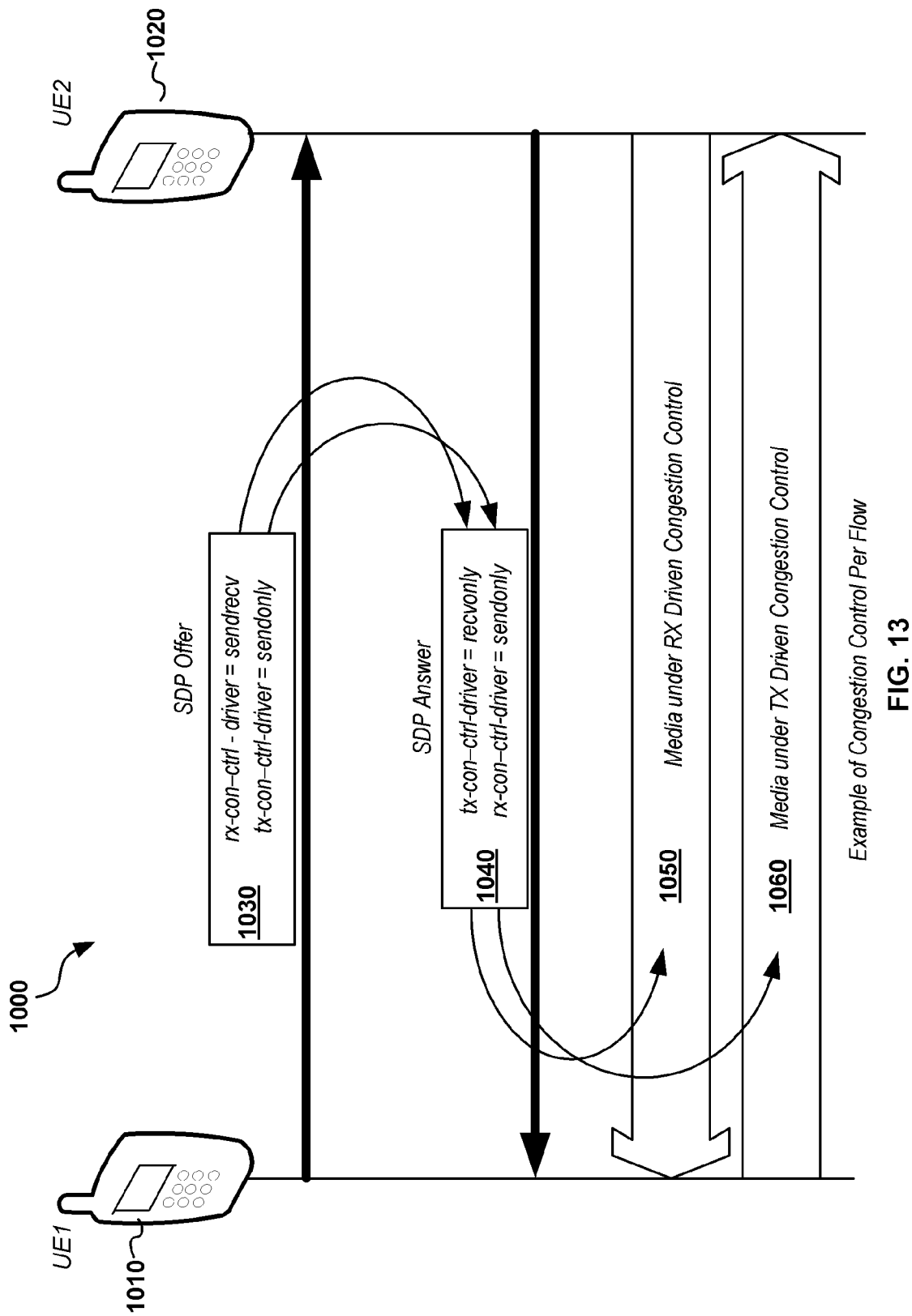
FIG. 13 illustrates two terminals exchanging rx-con-cntrl-driver and tx-con-cntrl-driver values to establish different congestion control mechanisms in alternate communication directions.

FIG. 12 illustrates another example interaction 900 where a terminal 910 sends the same parameter (i.e., sendrecv 930), but a second terminal 920, which may not be ECN compatible or may otherwise be unable to reply based on the sender's parameter, replies 940 with no parameter, a default parameter, or otherwise indicates that it is not compatible with the sender's congestion control mode. In this case, media 950 and 960 may be sent without ECN congestion control.

Other implementations are also possible. For example, if a sender indicates that it is only capable of receiver driven operation and the receiver is only compatible with sender driven operation, or vice-versa, an incompatibility may occur. This may be further addressed as described subsequently using interworking functions and an interworking gateway, such as an MRFP gateway 1240 as shown in FIG. 12. The gateway 1240 may monitor messages sent between the terminals and determine whether emulation is necessary to facilitate communication based on the parameter, default parameter, etc. in reply 940. Communication may be initiated by substituting an appropriate reply for 940, as discussed below in FIG. 16 regarding state 3102.

SDP Protocol Example—Unidirectional Receiver/Sender Control

In addition, in some implementations, different congestion control mechanisms may be used for transmissions in alternate directions or flows. This may be implemented by including and processing two parameter values in each of the SDP Offer and SDP Answer. These parameters are referred to as "rx-con-ctrl-driver" and "tx-con-ctrl-driver" in certain aspects. An example of this implementation is shown in interaction 1000 of FIG. 13. In this example, there may be different configurations per flow, or in each direction between the terminals. In particular, a first terminal 1010, which may be a UE such as UE1, sends a SDP Offer 1030 which may contain two parameters—a first parameter corresponding to terminal 1010's capabilities with respect to transmit (the tx-con-ctrl value) and a second parameter corresponding to terminal 1010's capabilities as a receiver (the rx-con-ctrl value). At a second terminal 1020, which may be a UE such as UE2, the SDP Offer 1030 is received, and an SDP Answer 1040 may be generated and sent to UE1 1010. In this example, the SDP Answer 1040 includes a recvonly parameter value for tx-con-ctrl and a sendonly parameter value of rx-con-ctrl. These parameters correspond to terminal 1020 indicating that terminal 1020 will function under transmit driven congestion control as a receiver and receiver driven congestion control as a sender.

SDP Protocol Example—Unidirectional Sender/Receiver Control

Figure 14:
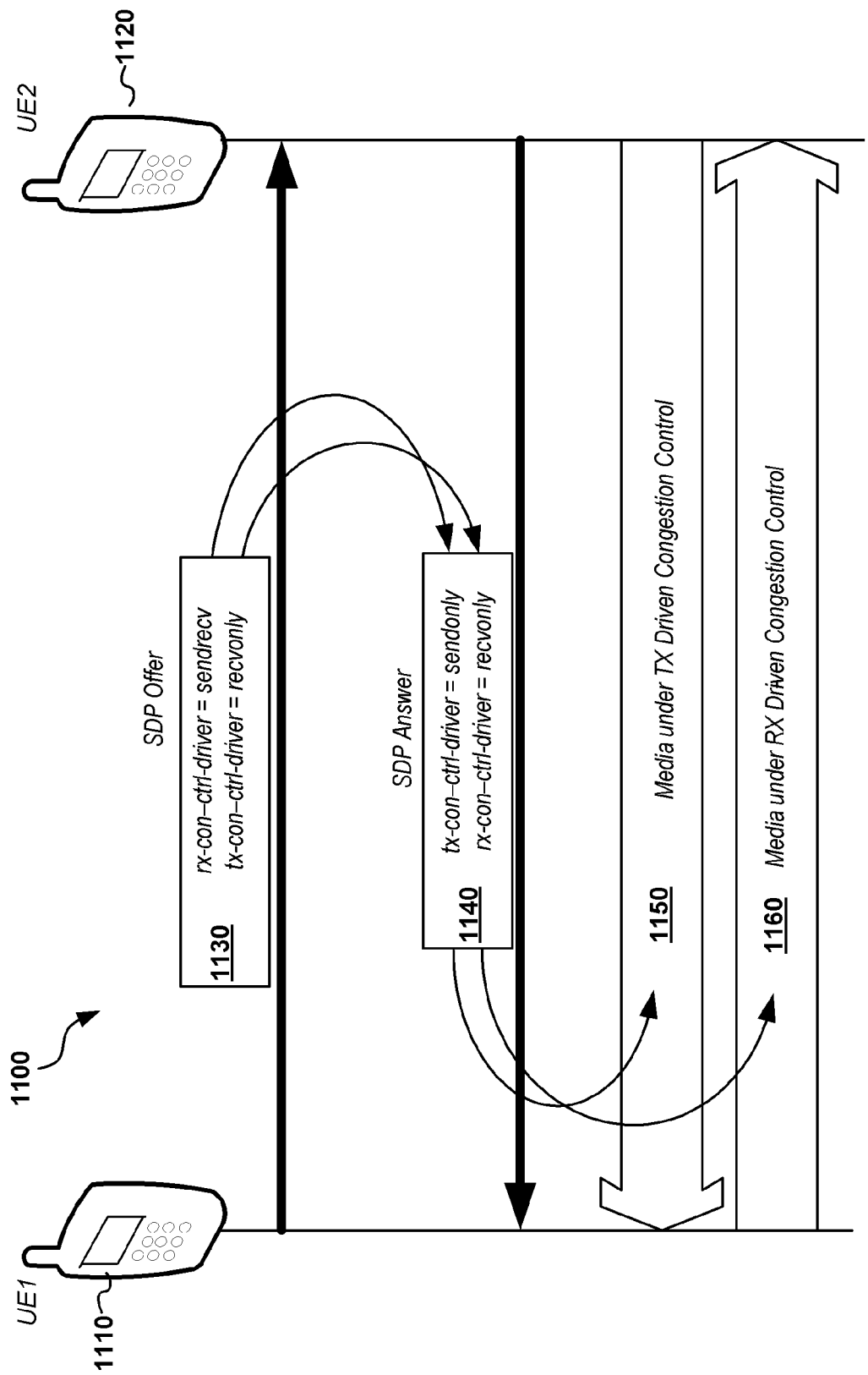
FIG. 14 illustrates another example of a rx-con-cntrl-driver and tx-con-cntrl-driver parameter value exchange between two terminals.

FIG. 14 illustrates another example interaction 1100 where terminal 1110 provides an SDP Offer 1130 with values as shown. Assuming terminal 1120 is compatible with both of the offered parameters, terminal 1120 may reply with an SDP answer 1140 as shown in this example with an rx-con-ctrl-driver value of sendonly and a tx-con-ctrl-driver value of recvonly, resulting in the congestion control mechanisms for media 1150 and 1160 as shown.

Interworking Gateway for Congestion Control

Figure 15:
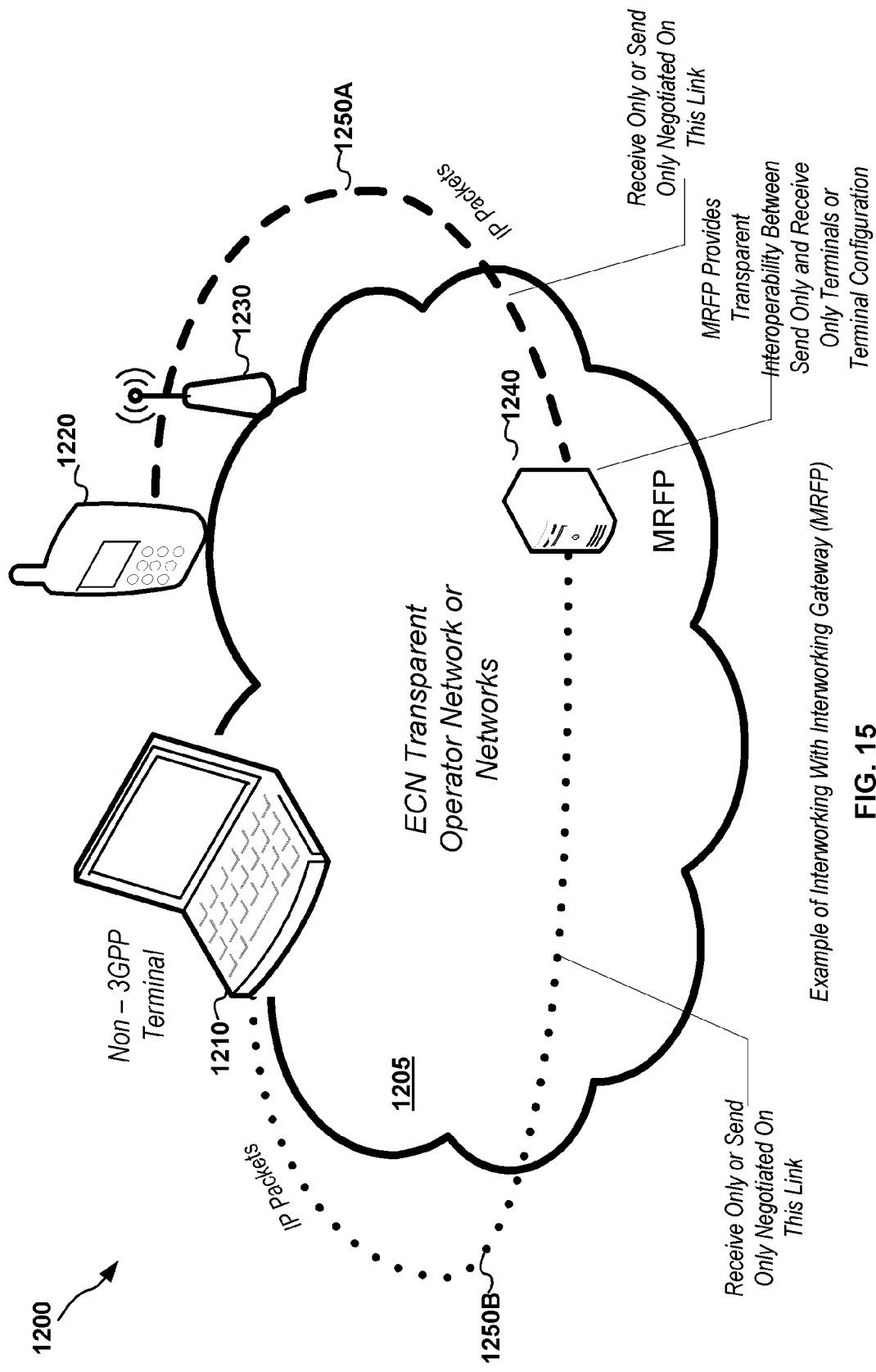
FIG. 15 illustrates a general network topology facilitating ECN transparent communications between networks with the use of an interworking gateway.

FIG. 15 illustrates a networking configuration 1200, similar to the configuration shown in FIG. 5. However, the configuration 1200 also includes an interworking gateway function, which may be implemented in MRFP gateway 1240, and/or in core network components or other network components (not shown). Gateway 1240 may be used to provide interworking functions to facilitate management of receiver and sender driven ECN congestion control between terminals, such as UEs or other terminal devices, within a particular operator's network, and/or between networks associated with different operators. The interworking gateway 1240 may provide functionality when the two terminals only support different ECN congestion control mechanisms (e.g., sender driven vs receiver driven control).

In some implementations, terminal 1210 may be a non-3GPP device, however, in other implementations terminal 1210 may be a 3GPP device. In a typical communication between the devices, a signal may be sent from terminal 1220 to terminal 1210, and may include transmission through a node such as a base station 1230, as well as other elements of network 1205, such as, for example, routers, switches, and/or other components. In one example, these components comprise a core network of a particular operator. In other examples, these components comprise core network elements of one or more operators. During transmission between terminals 1210 and 1220, congestion may be encountered. The transmissions may be based on the Internet Protocol (IP) and may be IP packets. In networks that support Explicit Congestion Notification (ECN), packets may be marked or tagged accordingly. In the networking configuration 1200, an interworking gateway 1240, such as Multimedia Resource Function Processor (MRFP) is included. Transmissions, such as IP packets 1250A from terminal 1220 may be intercepted by the interworking gateway 1240. Similarly, transmissions such as IP Packets 1250B travelling from terminal 1210 may be intercepted at interworking gateway 1240. The intercepted transmissions may comprise a first congestion control mode which is incompatible with the congestion control mode of the recipient terminal. The interworking gateway 1240 may perform operations, either by modifying, removing, or replacing the intercepted transmission, to a form compatible with the recipient's congestion control mode. In some instances one of devices 1220 or 1210 may specify the adapted rate of transmission based on congestion. In other instances the interworking gateway 1240 may instead determine the adapted rate, and may transcode media to this rate. In some embodiments, the interworking gateway 1240 determines the rate and then conveys the determined rate to one of the terminals so that the terminal may implement the adaptation.

Overview of Interworking Gateway Operation

Figure 16:
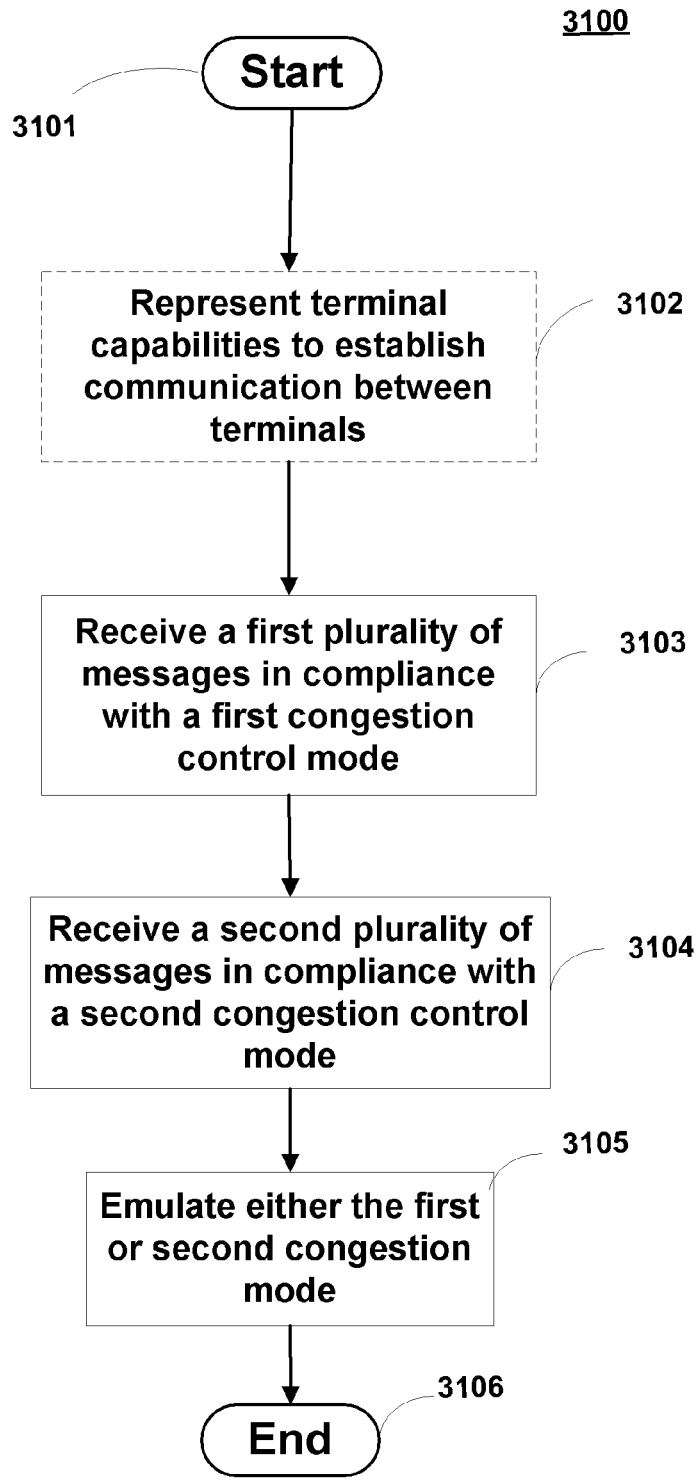
FIG. 16 illustrates a flow diagram for a method, implemented at an interworking gateway, for handling communication between terminals operating in incompatible congestion modes.

FIG. 16 illustrates a flow diagram for the general method by which an interworking gateway may perform certain of the functions depicted in FIGS. 17-20. In these examples, each of the terminals may be operating in incompatible congestion control modes. For example, a first terminal operating in "sendonly" congestion mode may desire to send IP packets to a second terminal. The interworking gateway may determine the existence of incompatible congestion modes by analyzing the transmitted messages. In some embodiments, the interworking gateway may instead determine the existence of incompatible congestion modes by consulting a table indicating the known congestion modes for a plurality of terminals.

The interworking gateway performing process 3100 may begin at state 3102 by representing the terminal capabilities to each terminal so as to establish communication therebetween. For example, if the first terminal is configured in sender-driven congestion control mode, it may be incompatible and unwilling to communicate with a terminal operating in receiver-driven congestion control mode. Were the first terminal to initiate communication with the second terminal directly, such as by extending an SDP offer as described above, the communication would be rejected as neither terminal would be willing or able to operate by the other's congestion control mode. Alternatively, as indicated in FIG. 12, the terminals may agree to communicate, but they would not be able to use any congestion control. Accordingly, to begin the interworking process, at state 3102 the gateway 1240 may modify SDP offers and responses, or similar messaging packets, to represent compatible congestion control modes between the terminals. That is, if the first terminal is only able to operate with a receiver-driven second terminal, the interworking gateway may modify communications from the second terminal so that the terminal appears to be capable of operating in receiver-driven mode. In some aspects, the gateway may modify bits in a message to indicate the desired capability. The gateway may perform this function independent of the second terminal's actual congestion control capabilities or preferences.

Once the terminals are willing to communicate, they may each send messages which may be received by the interworking gateway at steps 3103 and 3104. Based on the identified congestion modes of the first and second terminals, the interworking gateway may proceed to state 3105 and emulate either of the congestion modes when relaying either the first or second plurality of messages. Emulation may comprise certain of the operations discussed below in relation to FIGS. 17-20, but will more generally be understood to comprise any operations permitting messages from the first plurality to be communicated to the second terminal, and messages from the second plurality to be communicated to the first terminal, in a manner compliant with the recipient's congestion mode. These operations may include modifying or substituting messages so as to be in compliance with the congestion mode of the recipient terminal, examples of which are discussed above in relation to FIGS. 17-20. The interworking gateway may perform these operations with knowledge of each terminals respective capabilities and/or preferences. Alternatively, the interworking gateway may presume default values for each terminal's operation.

Each of the above operations may be performed using various components depicted in FIG. 4, although one will readily recognize a plurality of alternative devices and configurations capable of performing these functions. For example, means for receiving a first plurality of messages from a first device may comprise a first UE signaling interface 2020 which may comprise a receiver. Means for receiving a second plurality of messages from a second device may comprise a second UE signaling interface 2030 which may comprise a receiver. In some systems, it will be understood that a single device may serve the functions of both the first 2020 and second 2030 signaling interfaces. Such a device may be located on the same machine as other components of the interworking gateway, or may be located separately as a peripheral device. Means for emulating either the first or the second congestion control mode may comprise processor module 2010 operating in conjunction with firmware or software found in memory 2050. The emulating means would substitute, modify, or retransmit the received messages in accordance with the above discussion referencing FIGS. 17-20. In some instances the emulating means may comprise software which takes action on a case-by-case basis depending on the congestion control mode of the received packets. For example, the software may perform a specified set of operations for each collection of messages corresponding to the operations of FIG. 17 once the interworking gateway has identified that the first terminal 1310 operates in sender-driven congestion control and second terminal 1320 operates in receiver-driven congestion control. Means for modifying an ECN feedback message or rate request message as well as means for resending data may comprise one or more modules of programs modules 2060 working in memory 2050. Such modules may perform the functions described with respect to the FIGS. 17-20 herein. Means for transmitting a message may similarly comprise one of the UE signaling interfaces.

Interworking Gateway Examples—With and Without Transcoding

FIG. 17 illustrates ECN congestion control signaling using an interworking gateway between a first terminal operating in sender-driven congestion control which sends media to a second terminal operating in receiver-driven congestion control. In this case, a first terminal 1310, which is also denoted as UE Tx based on the UE's Tx driven congestion functionality, may be in communication with a second terminal 1320, denoted as UE Rx based on the UE's Rx driven congestion functionality. An interworking gateway 1340, which may be an MRFP as shown in FIG. 17, is coupled between the UE Rx and UE Tx to intercept media transmissions between the UEs and to process, i.e. transcode or emulate, signaling to provide interworking functionality between the two UEs. The terms "transcoding" and "emulation" may be used throughout this specification to refer to the various disclosed processes for relaying information from a terminal operating in a first congestion control mode to a second terminal operating in a second congestion control mode, where the second congestion control mode is incompatible with the first congestion control mode. For example, two terminals operating respectively in the sendonly and recvonly modes may be incompatible, but a transcoding or emulating interworking gateway may substitute rate/mode request messages with ECN feedback messages, block rate/request messages, etc. so as to facilitate rate adaptation despite the incompatible modes. The data rate of media may be adjusted as part of the "transcoding" process.

Two examples of this interworking functionality are shown in interactions 1300A and 1300B. In 1300A, terminal 1310 sends RTP Media 1330 to terminal 1320. The media may encounter congestion during transmission and be correspondingly marked 1335 using ECN marking, such as setting CE bits. Upon receipt, terminal 1320, which is configured to be Rx driven, may determine an adaptation rate (consistent with receiver driven congestion control) and send an RTCP/RTP rate/mode request message 1341 to terminal 1310. However, since terminal 1310 is TX driven, it may expect receipt of an ECN feedback message rather than a rate/mode request message. Accordingly, gateway 1340 may intercept the message 1341 with no further signaling sent to terminal 1310 (in another example shown in 1300B, signaling may be instead provided). Terminal 1310, unaware of terminal 1320's attempt to specify a transmission rate, may then send RTP media 1352. RTP media 1352 is not adapted for the link between the gateway 1340 and terminal 1320. In particular, since the terminal 1310 may not have received any indication of congestion and marking 1335, terminal 1310 may send data at a higher rate than would be appropriate for the link between gateway 1340 and terminal 1320. The gateway 1340 may process the received RTP Media 1352 to a lower data rate itself to facilitate communication. Gateway 1340 may select the lower data rate based upon the information contained in rate request message 1341. The transcoded media 1354 may then be sent to terminal 1320 at the lower rate. This may provide send/receive transparency while mitigating potential congestion in the link between gateway 1340 and terminal 1320.

In interaction 1300B, an alternate approach may be used. In this example, the gateway 1340 intercepts the RTCP/RTP request message 1341 and generates an ECN feedback message 1370 for transmission to terminal 1310. Interworking gateway 1340 may generate ECN feedback message 1370 with knowledge of terminal 1310's functionality. For example, gateway 1340 may know that an ECN feedback message indicating more than a particular level of congestion will result in terminal 1310 transmitting data at a data rate commensurate with the request in rate request message 1341. In this manner, terminal 1310 may make its own determination as to an appropriate rate, while still producing data compatible with the rate request message 1341 from terminal 1320. In some aspects, gateway 1340 may consult terminal 1310 or a table of terminal preferences to select the appropriate parameters to insert in message 1370.

Figure 18:
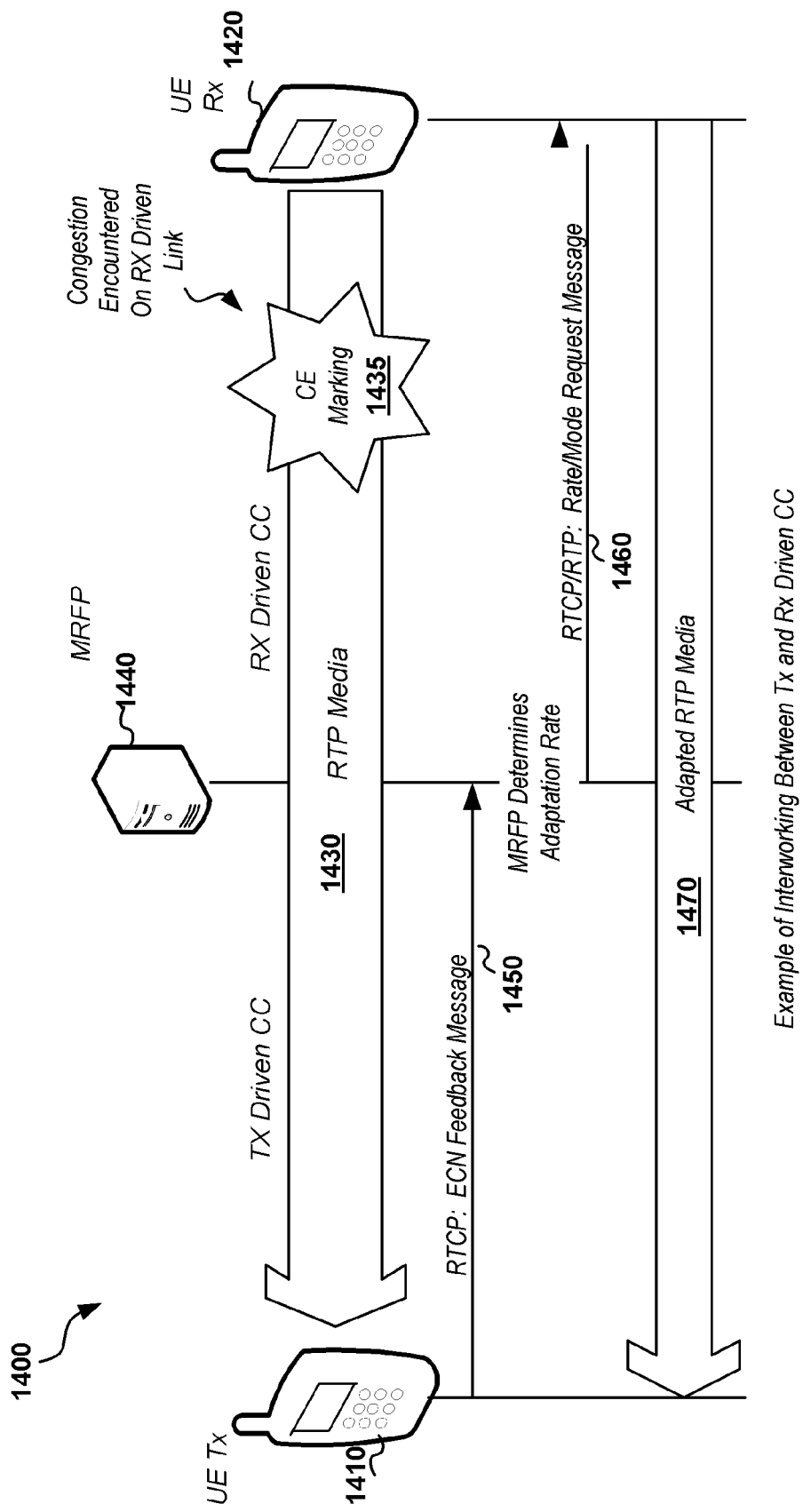
FIG. 18 illustrates an embodiment where an interworking gateway, determines an appropriate adaptation rate when a receiver-driven congestion mode terminal sends congestion marked data to a sender-driven congestion mode terminal.

Interworking Gateway Example—Rate Adaptation Determination by Gateway/Prior Congestion FIG. 18 illustrates another example of processing, which may be performed by an interworking gateway 1440, such as an MRFP, to facilitate different congestion mode configurations between terminal 1410 and terminal 1420. In this example, terminal 1410 may be configured as a UE Tx while terminal 1420 may be configured as a UE Rx. If terminal 1420 sends media 1430 which is subject to congestion and marking 1435 in the link between the terminal 1420 and gateway 1440, as shown, the gateway may allow media 1430 to pass through, including the CE or other ECN marking, without adjustment or substitution. After receipt of marked media 1430 at the terminal 1410, the terminal 1410 may send an ECN feedback message 1450 indicating receipt of CE marked packets, in accordance with a sender driven ECN configuration. Based on terminal 1420's earlier transmission, gateway 1440 may recognize that UE 1420 is configured to be receiver driven. Alternatively, gateway 1440 may have been informed of terminal 1420's congestion mode directly, such as by consulting a table. Accordingly, the gateway 1440 may now intercept UE 1410's feedback message and generate, based on the knowledge that UE 1420 is configured to be receiver driven, an RTCP/RTP rate/mode request message 1460. The selected rate and mode may be based on knowledge of the network, and may include information extracted from media 1430 and/or other network conditions or parameters. Upon receipt of the message 1460, terminal 1420 may then generate media for transmission to terminal 1410 at an adapted rate (e.g., a lower or higher rate, which may be based on the rate/mode request message).

Interworking Gateway Example—Rate Adaptation Determination by Sender

Figure 19:
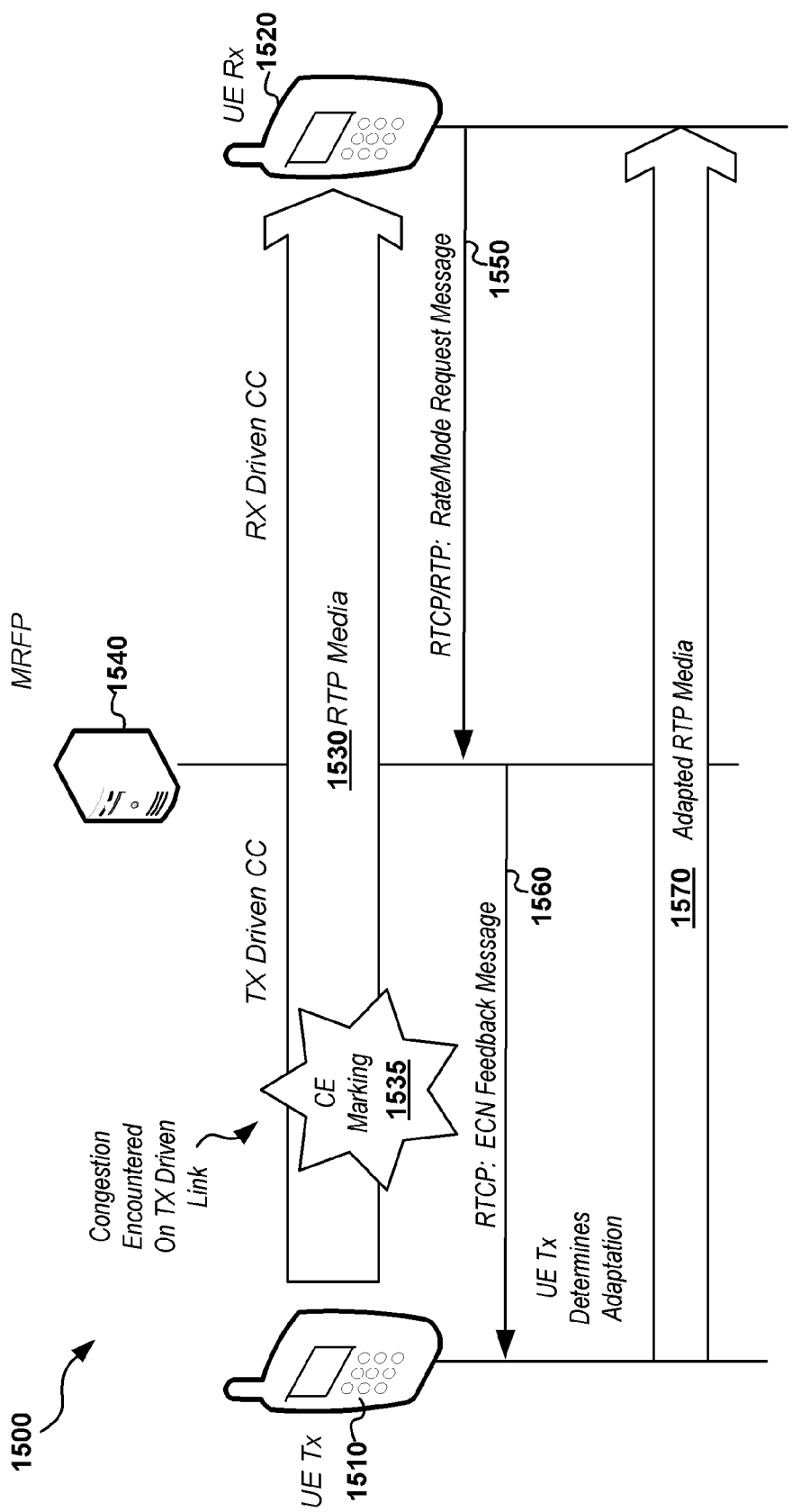
FIG. 19 illustrates an embodiment where an interworking gateway relays congestion marked data from a sender-driven congestion mode terminal to a receiver-driven congestion mode terminal.

FIG. 19 illustrates another example of processing, which may be performed by interworking gateway 1540. In this case, media 1530 sent from terminal 1510 may experience congestion. The media 1530 may accordingly be marked 1535 in the link between the terminal 1510 and gateway 1540. Upon receipt of the marked media at terminal 1520, the terminal 1520 may send a rate/mode request message 1550, which may be consistent with a receiver driven ECN congestion configuration. Gateway 1540 may intercept the rate/mode request message 1550, generate, and then send an ECN feedback message 1560, consistent with a sender driven ECN congestion configuration. Again, Gateway 1540 may have determined UE 1510's congestion mode based on an earlier transmission, or may have been informed of the congestion mode by consulting a table or other source of congestion mode information.

In some implementations, gateway 1540 may remove the CE markings from media 1530 before forwarding the unmarked media to terminal 1520. In this case, terminal 1520 may not generate message 1550. However, the gateway 1540 may still send the message 1560 to direct terminal 1510 to transmit at a higher or lower data rate. Accordingly, the interworking gateway's 1540 generation of the ECN feedback message 1560 may be based on a plurality of factors, including, for example, the CE markings 1535 on media 1530, the congestion control mode of UE 1520, and the capabilities of UE 1510. Alternatively, one will recognize that in all of these embodiments the gateway may perform its modifications independently of the preferences of the terminals, and provide the bare minimum of processing to facilitate interworking. Upon receipt of the message 1560, terminal 1510 may then determine an appropriate adaptation data rate and may then send adapted media 1570 to terminal 1520.

Figure 20:
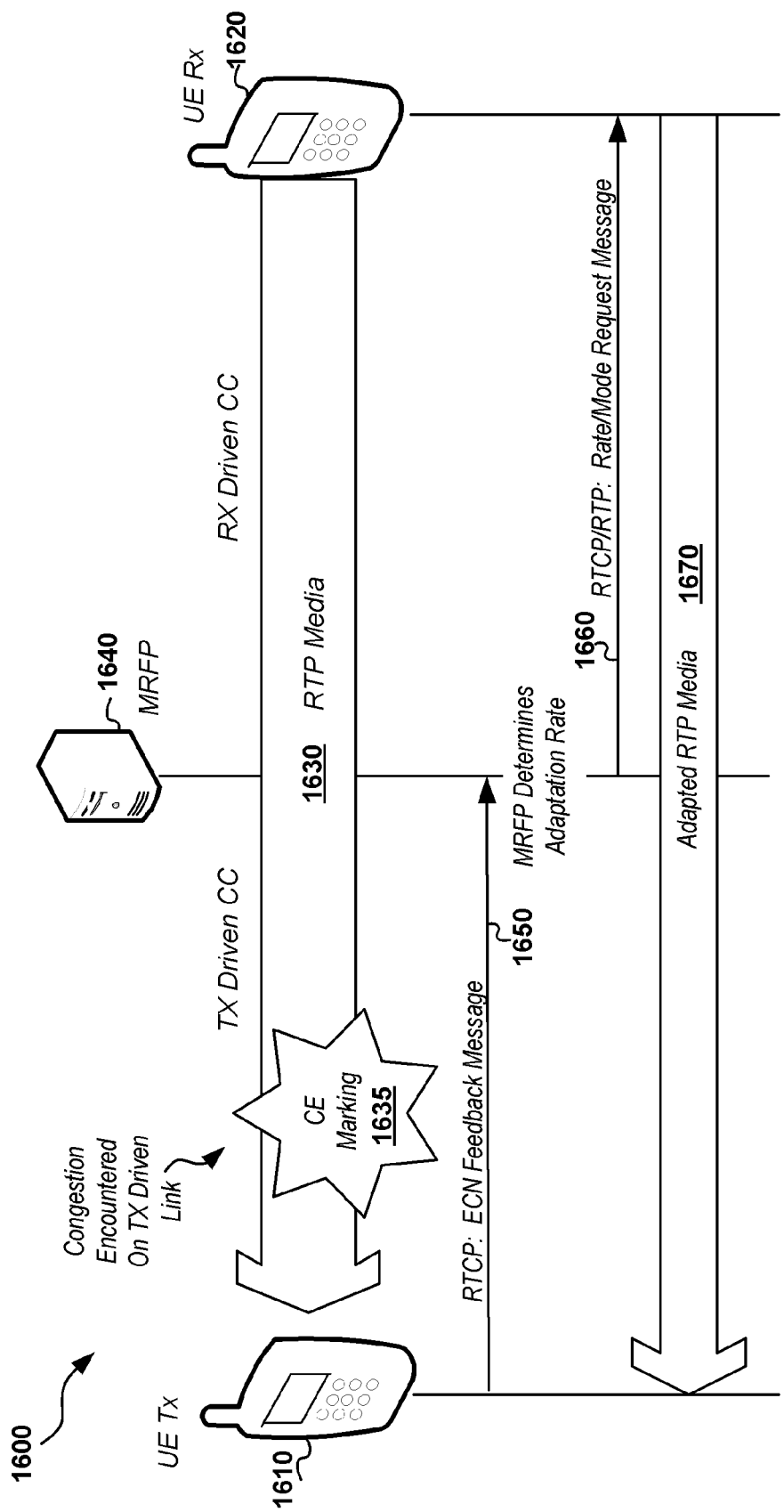
FIG. 20 illustrates an embodiment where an interworking gateway determines an appropriate adaptation rate for media sent from a receiver-driven congestion control mode terminal when congestion is encountered between the interworking gateway and a sender-driven congestion control mode terminal.

Interworking Gateway Example—Rate Adaptation Determination by Gateway/Post Congestion FIG. 20 illustrates another example of processing, which may be performed by interworking gateway 1640. In this case, terminal 1620 may send media 1630 to terminal 1610. The media may encounter congestion and be marked 1635 in the link between the gateway 1640 and terminal 1610. In response, terminal 1610, which is configured in a sender driven ECN congestion mode, may send an ECN feedback message 1650. Gateway 1640 may intercept ECN feedback message 1650. Terminal 1620 may be configured in a receiver driven ECN congestion mode, and may accordingly expect an RTCP/RTP rate/mode request message. Gateway 1640 may generate such a RTCP/RTP rate/mode request message 1660 and provide it to terminal 1620. As discussed above, gateway 1640 may refer to a variety of factors when generating this message, such as the content of ECN feedback message 1650. Terminal 1620 may then adapt the rate of media 1670 sent to terminal 1610, to a higher or lower rate. The adapted rate may be based on rate/mode information in the RTCP/RTP message. As discussed above, gateway 1640 may generate the contents of message 1660 with knowledge of terminal 1620's functionality, to cause terminal 1620 to transmit at a desired data rate.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. The term "computer system" may refer to a processor, a processor operating in conjunction with a memory to run software, a plurality of processors, a plurality of processors operating in conjunction with a plurality of memories to run software, and variations commonly known thereof.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

What is claimed is:

1. An interworking gateway for controlling data congestion, comprising:
    a memory; and
    a processor, operatively coupled to the memory and configured to:
        receive a first plurality of messages from a first device, the first plurality of messages in compliance with a first congestion control mode, the first congestion control mode comprising at least one of a first sender-driven or a first receiver-driven congestion control;
        receive a second plurality of messages from a second device, the second plurality of messages in compliance with a second congestion control mode, the second congestion control mode comprising one of a second sender-driven or a second receiver-driven congestion control; and
        emulate either the first or the second congestion control mode when communicating messages from one of the first or second devices in one of the first or second congestion control modes to the other of the first or second devices in the other of the first or second congestion control modes.

2. The interworking gateway of claim 1, wherein the processor is configured to receive the first plurality of messages by receiving at least one of an ECN feedback message or a rate request message from the first device.

3. The interworking gateway of claim 2, wherein the processor is further configured to modify the at least one of the ECN feedback message or the rate request message and to resend data received at a first data rate from one of the first or second devices to the other of the first or second devices at a second data rate.

4. The interworking gateway of claim 3, wherein the first data rate and the second data rate are different.

5. The interworking gateway of claim 3, wherein the at least one of the ECN feedback message or the rate request message comprises the ECN feedback message, wherein the processor is further configured to modify the at least one of the ECN feedback message or the rate request message by transmitting the rate request message, and wherein the rate request message is generated based on the ECN feedback message.

6. The interworking gateway of claim 5, wherein the ECN feedback message is compliant with a sender-driven congestion control mode and the transmitted rate request message is compliant with a receiver-driven congestion control mode.

7. The interworking gateway of claim 6, wherein the processor is further configured to receive a message from the first device, wherein the message comprises a congestion encountered marking on a receiver-driven congestion control link.

8. The interworking gateway of claim 6, wherein the processor is further configured to transmit a message to the second device, wherein the message comprises a congestion encountered marking on a sender-driven congestion control link.

9. The interworking gateway of claim 3, wherein the at least one of the ECN feedback message or the rate request message comprises the rate request message, and wherein the processor is further configured to modify the at least one of the ECN feedback message or the rate request message by intercepting the rate request message to the second device.

10. The interworking gateway of claim 9, wherein the rate request message is compliant with a receiver-driven congestion control mode and an ECN congestion message is compliant with a sender-driven congestion control mode.

11. The interworking gateway of claim 3, wherein the at least one of the ECN feedback message or the rate request message comprises the rate request message, wherein the processor is further configured to modify the at least one of the ECN feedback message or the rate request message by transmitting the ECN feedback message, and wherein the ECN feedback message is generated based on the rate request message.

12. The interworking gateway of claim 11, wherein the rate request message is compliant with a receiver-driven congestion control mode and an ECN congestion message is compliant with a sender-driven congestion control mode.

13. A method for controlling data congestion, the method comprising:
receiving a first plurality of messages from a first device, the first plurality of messages in compliance with a first congestion control mode, the first congestion control mode comprising at least one of a first sender-driven or a first receiver-driven congestion control;
receiving a second plurality of messages from a second device, the second plurality of messages in compliance with a second congestion control mode, the second congestion control mode comprising one of a second sender-driven or a second receiver-driven congestion control, the first congestion control mode not operable with the second congestion control mode; and
emulating either the first or the second congestion control mode when communicating messages from one of the first or second devices in one of the first or second congestion control modes to the other of the first or second devices in the other of the first or second congestion control modes.

14. The method of claim 13, wherein receiving the first plurality of messages comprises receiving at least one of an ECN feedback message or a rate request message from the first device.

15. The method of claim 14, further comprising modifying the at least one of the ECN feedback message or the rate request message and resending data received at a first data rate from one of the first or second devices to the other of the first or second devices at a second data rate.

16. The method of claim 15, wherein the first data rate and the second data rate are different.

17. The method of claim 15, wherein the at least one of the ECN feedback message or the rate request message comprises the ECN feedback message, wherein the modifying of the at least one of the ECN feedback message or the rate request message comprises transmitting the rate request message, and wherein the rate request message is generated based on the ECN feedback message.

18. The method of claim 17, wherein the ECN feedback message is compliant with a sender-driven congestion control mode and the transmitted rate request message is compliant with a receiver-driven congestion control mode.

19. The method of claim 18, further comprising receiving a message from the first device, wherein the message comprises a congestion encountered marking on a receiver-driven congestion control link.

20. The method of claim 18, further comprising transmitting a message to the second device, wherein the message comprises a congestion encountered marking on a sender-driven congestion control link.

21. The method of claim 15, wherein the at least one of the ECN feedback message or the rate request message comprises the rate request message, wherein the modifying of the at least one of the ECN feedback message or the rate request message comprises intercepting the rate request message to the second device.

22. The method of claim 21, wherein the rate request message is compliant with a receiver-driven congestion control mode and an ECN congestion message is compliant with a sender-driven congestion control mode.

23. The method of claim 15, wherein the at least one of the ECN feedback message or the rate request message comprises the rate request message, wherein the modifying of the at least one of the ECN feedback message or the rate request message comprises transmitting the ECN feedback message, and wherein the ECN feedback message is generated based on the rate request message.

24. The method of claim 23, wherein the rate request message is compliant with a receiver-driven congestion control mode and an ECN congestion message is compliant with a sender-driven congestion control mode.

25. A non-transitory computer-readable medium having stored thereon instructions that, when executed, cause at least one computer system to:
receive a first plurality of messages from a first device, the first plurality of messages in compliance with a first congestion control mode, the first congestion control mode comprising at least one of a first sender-driven or a first receiver-driven congestion control;
receive a second plurality of messages from a second device, the second plurality of messages in compliance with a second congestion control mode, the second congestion control mode comprising one of a second sender-driven or a second receiver-driven congestion control, the first congestion control mode not operable with the second congestion control mode; and emulate either the first or the second congestion control mode when communicating messages from one of the first or second devices in one of the first or second congestion control modes to the other of the first or second devices in the other of the first or second congestion control modes.

26. The non-transitory computer-readable medium of claim 25, further having stored thereon instructions that, when executed, cause the at least one computer system to:

receive the first plurality of messages comprises receiving at least one of an ECN feedback message or a rate request message from the first device.

27. The non-transitory computer-readable medium of claim 26, further having stored thereon instructions that, when executed, cause the at least one computer system to:

modify the at least one of the ECN feedback message or the rate request message and resend data received at a first data rate from one of the first or second devices to the other of the first or second devices at a second data rate.

28. The non-transitory computer-readable medium of claim 27, wherein the first data rate and the second data rate are different.

29. The non-transitory computer-readable medium of claim 27, wherein the at least one of the ECN feedback message or the rate request message comprises the ECN feedback message, wherein the medium further has stored thereon instructions that, when executed, cause the at least one computer system to modify the at least one of the ECN feedback message or the rate request message by transmitting the rate request message, and wherein the rate request message is generated based on the ECN feedback message.

30. The non-transitory computer-readable medium of claim 29, wherein the ECN feedback message is compliant with a sender-driven congestion control mode and the transmitted rate request message is compliant with a receiver-driven congestion control mode.

31. The non-transitory computer-readable medium of claim 30, further having stored thereon instructions that, when executed, cause the at least one computer system to:

receive a message from the first device, wherein the message comprises a congestion encountered marking on a receiver-driven congestion control link.

32. The non-transitory computer-readable medium of claim 30, further having stored thereon instructions that, when executed, cause the at least one computer system to:

transmit a message to the second device, wherein the message comprises a congestion encountered marking on a sender-driven congestion control link.

33. The non-transitory computer-readable medium of claim 27, wherein the at least one of the ECN feedback message or the rate request message comprises the rate request message, wherein the medium further has stored thereon instructions that, when executed, modify the at least one of the ECN feedback message or the rate request message by intercepting the rate request message to the second device.

34. The non-transitory computer-readable medium of claim 33, wherein the rate request message is compliant with the receiver-driven congestion control mode and an ECN congestion message is compliant with a sender-driven congestion control mode.

35. The non-transitory computer-readable medium of claim 27, wherein the at least one of the ECN feedback message or the rate request message comprises the rate request message, wherein the medium further has stored thereon instructions that, when executed, modify the at least one of the ECN feedback message or the rate request message by transmitting the ECN feedback message, and wherein the ECN feedback message is generated based on the rate request message.

36. The non-transitory computer-readable medium of claim 35, wherein the rate request message is compliant with a receiver-driven congestion control mode and an ECN congestion message is compliant with a sender-driven congestion control mode.

37. An interworking gateway for controlling data congestion, comprising:

means for receiving a first plurality of messages from a first device, the first plurality of messages in compliance with a first congestion control mode, the first congestion control mode comprising at least one of a first sender-driven or a first receiver-driven congestion control;

means for receiving a second plurality of messages from a second device, the second plurality of messages in compliance with a second congestion control mode, the second congestion control mode comprising one of a second sender-driven or a second receiver-driven congestion control, the first congestion control mode not operable with the second congestion control mode; and means for emulating either the first or the second congestion control mode when communicating messages from one of the first or second devices in one of the first or second congestion control modes to the other of the first or second devices in the other of the first or second congestion control modes.

38. The interworking gateway of claim 37, wherein the means for receiving the first plurality of messages comprises a first receiver, the means for receiving the second plurality of messages comprises a second receiver, and the means for emulating comprises a computer system.

39. The interworking gateway of claim 37, further comprising:

means for modifying at least one of the ECN feedback message or a rate request message; and means for resending data received at a first data rate from one of the first or second devices to the other of the first or second devices at a second data rate.

40. The interworking gateway of claim 39, wherein the at least one of the ECN feedback message or the rate request message comprises the ECN feedback message, wherein the means for modifying comprises means for transmitting the rate request message, and wherein the rate request message is generated based on the ECN feedback message.

41. The interworking gateway of claim 39, wherein the at least one of the ECN feedback message or the rate request message comprises the rate request message, wherein the means for modifying comprises means for transmitting the ECN feedback message, and wherein the ECN feedback message is generated based on the rate request message.

42. The interworking gateway of claim 41, wherein the rate request message is compliant with a receiver-driven congestion control mode and an ECN congestion message is compliant with a sender-driven congestion control mode.

43. The interworking gateway of claim 37, wherein at least one message from the first plurality of messages comprises a congestion encountered marking on a receiver-driven congestion control link.

44. The interworking gateway of claim 37, further comprising means for transmitting a message to the second device, wherein the message comprises a congestion encountered marking on a sender-driven congestion control link.

* * * * *